US011552322B2

(12) United States Patent
Babanova et al.

(10) Patent No.: US 11,552,322 B2
(45) Date of Patent: Jan. 10, 2023

(54) BRANCHED ANODES FOR MICROBIAL FUEL CELLS

(71) Applicant: Aquacycl, Inc., Escondido, CA (US)

(72) Inventors: Sofia Malinova Babanova, San Diego, CA (US); Orianna Bretschger, San Diego, CA (US)

(73) Assignee: AQUACYCL, INC., San Diego, CA (US)

( * ) Notice: Subject to any disclaimer, the term of this patent is extended or adjusted under 35 U.S.C. 154(b) by 202 days.

(21) Appl. No.: 16/521,245

(22) Filed: Jul. 24, 2019

(65) Prior Publication Data

US 2020/0036029 A1 Jan. 30, 2020

Related U.S. Application Data

(60) Provisional application No. 62/702,544, filed on Jul. 24, 2018.

(51) Int. Cl.
*H01M 4/86* (2006.01)
*H01M 8/16* (2006.01)
(Continued)

(52) U.S. Cl.
CPC ........... *H01M 8/16* (2013.01); *H01M 4/8673* (2013.01); *H01M 4/8875* (2013.01); *H01M 4/96* (2013.01)

(58) Field of Classification Search
CPC .... H01M 8/16; H01M 4/8875; H01M 4/8673; H01M 4/96; H01M 4/8626; Y02E 60/50
See application file for complete search history.

(56) References Cited

U.S. PATENT DOCUMENTS

| 3,235,234 A | 2/1966 | Beaudoin |
| D236,463 S | 8/1975 | Giovagnoli et al. |

(Continued)

FOREIGN PATENT DOCUMENTS

| JP | 2014008461 A | 1/2014 |
| WO | 2007131022 A2 | 11/2007 |
| WO | 2014144705 A2 | 9/2014 |

OTHER PUBLICATIONS

Hutchinson, Analysis of carbon fiber brush loading in anodes on startup and performance of microbial fuel cells, Journal of Power Sources, 196 (2011) 9293-9219. (Year: 2011).*

(Continued)

*Primary Examiner* — Cynthia K Walls
(74) *Attorney, Agent, or Firm* — Perkins Coie LLP

(57) ABSTRACT

Disclosed are anode electrode structures for microbial fuel cell (MFC) devices, systems and methods for treating wastewater and generating electrical energy through a bioelectrochemical waste-to-energy conversion process. In some aspects, an anode electrode includes a conductive core and a plurality of sheets of conductive textile material wound around the conductive core. In some aspects, the anode electrode is produced by cutting sheets of a conductive textile material to form a stem and a plurality of branches connected to the stem. The conductive textile material is pretreated to enhance the surface area, hydrophilicity, microbial attachment, and/or electrochemical activity of the conductive textile material. The sheets are stacked together and wound around a conductive core to produce the anode electrode. In implementations, the anode electrode can be used to transfer electrons removed from wastewater surrounding the branched electrode via an oxidation reaction on the electrode surface within the an MFC device.

17 Claims, 16 Drawing Sheets

(51) Int. Cl.
   *H01M 4/88* (2006.01)
   *H01M 4/96* (2006.01)

(56) References Cited

U.S. PATENT DOCUMENTS

| | | |
|---|---|---|
| D276,604 S | 12/1984 | King |
| 4,978,429 A | 12/1990 | Sears |
| D357,056 S | 4/1995 | Linton |
| 5,449,460 A | 9/1995 | Buisman |
| 5,736,049 A | 4/1998 | Bundy |
| 7,922,907 B2 | 4/2011 | Hassan et al. |
| D642,118 S | 7/2011 | Uneo |
| D646,636 S | 10/2011 | Riimala |
| 8,366,932 B1 | 2/2013 | Sung |
| 8,415,037 B2 | 4/2013 | Nealson et al. |
| 8,460,509 B2 | 6/2013 | Lakatos |
| 8,524,402 B2 | 9/2013 | He et al. |
| 8,597,513 B2 | 12/2013 | Borole et al. |
| D729,736 S | 5/2015 | Matthews |
| 9,321,666 B1 | 4/2016 | Reilly |
| D758,527 S | 6/2016 | Quiblier |
| D771,769 S | 11/2016 | Pin |
| 9,505,636 B2 | 11/2016 | Bretschger |
| 9,828,272 B2 | 11/2017 | Krieger |
| D862,378 S | 10/2019 | Leitner |
| D864,111 S | 10/2019 | Gleave |
| D864,622 S | 10/2019 | Lim |
| D870,058 S | 12/2019 | Archer |
| D870,686 S | 12/2019 | Archer |
| D875,207 S | 2/2020 | Babanova et al. |
| D875,208 S | 2/2020 | Babanova et al. |
| 10,570,039 B2 | 2/2020 | Bretschger et al. |
| D899,561 S | 10/2020 | Babanova et al. |
| D902,842 S | 11/2020 | Babanova et al. |
| 2003/0190742 A1 | 10/2003 | Whiteman |
| 2004/0045899 A1 | 3/2004 | Humphrey |
| 2004/0060857 A1 | 4/2004 | Pattee |
| 2004/0188334 A1 | 9/2004 | McWhirter |
| 2005/0244957 A1 | 11/2005 | Stock |
| 2005/0269262 A1 | 12/2005 | McBride |
| 2007/0200262 A1 | 8/2007 | Hills |
| 2008/0292912 A1 | 11/2008 | Logan et al. |
| 2009/0218299 A1 | 9/2009 | Cote |
| 2009/0226772 A1 | 9/2009 | Stark et al. |
| 2010/0003543 A1 | 1/2010 | Zhou |
| 2011/0042309 A1 | 2/2011 | Keeton |
| 2011/0140457 A1 | 6/2011 | Lakatos |
| 2012/0055859 A1 | 3/2012 | Reilly |
| 2012/0093692 A1 | 4/2012 | Blomberg |
| 2012/0152835 A1 | 6/2012 | Cardenas et al. |
| 2013/0266876 A1 | 10/2013 | Shechter |
| 2013/0302703 A1 | 11/2013 | Bretschger et al. |
| 2014/0021137 A1 | 1/2014 | Smiddy |
| 2014/0110323 A1 | 4/2014 | Al-Anzi |
| 2014/0141286 A1 | 5/2014 | Bretschger et al. |
| 2014/0266001 A1 | 9/2014 | Wilde |
| 2015/0014246 A1 | 1/2015 | McFadden |
| 2015/0251934 A1 | 9/2015 | Bretschger |
| 2015/0349350 A1 | 12/2015 | Liu et al. |
| 2016/0083952 A1 | 3/2016 | Lee |
| 2016/0115062 A1 | 4/2016 | Krieger |
| 2017/0275193 A1 | 9/2017 | Graves |
| 2017/0342698 A1 | 11/2017 | Fink |
| 2018/0097237 A1* | 4/2018 | Chadwick ............ H01M 4/96 |
| 2019/0301029 A1 | 10/2019 | May |
| 2020/0002200 A1 | 1/2020 | Bretschger et al. |
| 2020/0036029 A1 | 1/2020 | Babanova et al. |
| 2020/0270152 A1 | 8/2020 | Bretschger et al. |
| 2020/0270153 A1 | 8/2020 | Babanova et al. |

OTHER PUBLICATIONS

AquamTechnologies_SBIO'18, posted at youtube.com, posted Apr. 19, 2018, online, URL:https://www.youtube.com/watch?v=Sp795_Erp4c (Year: 2018).

Babanova, Sofia et al. "New Pretreatment Approaches to increase efficiency of anaerobic digesters", no date. Aquacycl LLC., pp. 1-13.

Babanova, Sofia. "New perspectives in sugar industry wastewater treatment," International Sugar Journal, Aug. 2020, pp. 62-65 (2pages).

Biffinger, Justin C., et al., "Engineering Microbial Euels Cells: Recent Patents and New Directions", US Naval Research Laboratory, Paper 22—http://digitalcommons.unl.edu/usnavyresearch/22 (2008) (7 pages).

Chung, Kyungmi, et al., "Continuous Power Generation and Microbial Community Structure of the Anode Biofilms in a Three-Stage Microbial Fuel Cell System", Appl Microbial Biotechnol (2009) 83:965-977.

Egbadon, Emmanuel, et al. "Simultaneous Generation of Bioelectricity and Treatment of Swine Wastewater in a Microbial Fuel Cell", International Letters of Natural Sciences—SSN: 2300-9675, vol. 54, pp. 100-107.

Eppinger, Mark, et al., "Comparative Analysis of Four Campylobacterales", Nature Reviews—Microbiology—vol. 2, Nov. 2004 I pp. 1-16.

Ginige, Maneesha P. et al., "Investigation of an Acetate-Fed Denitrifying Microbial Community by Stable Isotope Probing, Lull-Cycle rRNA Analysis, and Eluorescent In Situ Hybridization-Microautoradiography", Applied and Environmental Microbiology, vol. 71, No. 12—Dec. 2005, p. 8683-8691.

He, Weihua, et al., "The Effect of Faw Modes and Electrode Combinations on the Performance of a Multiple Module Microbial Fuel Cell Installed at Wastewater Treatment Plant", Water Research 105 (2016) 351-360.

Hutchinson, Adam J., et al., "Analysis of Carbon Fiber Brush Loading in Anodes on Startup and Performance of Microbial Fuel Cells", Journal of Power Sources 196 (2011) 9213-9219.

Ichihashi, 0., et al. "Removal and Recovery of Phosphorus as Struvite From Swine Wastewater Using Microbial Fuel Cell", Bioresource Technology 114 (2012) 303-307.

International Search Report and Written Opinion dated Sep. 30, 2019 of PCT/US2019/039899 (14 pages).

International Search Report and Written Opinion dated Jun. 10, 2020 of PCT/US2020/020177 (9 pages).

Ishii, Shun'ichi, et al., "A Novel Metatranscriptomic Approach to Identify Gene Expression Dynamics During Extracellular Electron Transfer", Nature Communications, 14:1601 I DOI: 10.1038/ncomms2615 I www.nature.com/naturecommunications—Received Nov. 26, 2012 I Accepted Feb. 19, 2013 I Published Mar. 19, 2013—pp. 1-10.

Ishii, Shun'ichi, et al., "Identifying the Microbial Communities and Operational Conditions for Optimized Wastewater Treatment in Microbial Fuel Cells", Water Research 47 (2013) 7120-7130.

Jimenez, Jose I., et al., "Genomic Insights in the Metabolism of Aromatic Compounds in Pseudomonas", Pseudomonas, vol. 3—Kluwer Academic/ Plenum Publishers, New York, 2004—pp. 425-462.

Kelly, Patrick T., et al., "Nutrients Removal and Recovery in Bioelectrochemical Systems: A review", Bioresource Technology 153 (2014) 351-360.

Kim, Jung R., et al., "Analysis of Ammonia Loss Mechanisms in Microbial Fuel Cells Treating Animal Wastewater", Biotechnology and Bioengineering, vol. 99, No. 5, Apr. 1, 2008—pp. 1120-1127.

Kim, Jung R., et al., "Removal of Odors from Swine Wastewater by Using Microbial Fuel Cells", Applied and Environmental Microbiology, Apr. 2008, p. 2540-2543—vol. 74, No. 8.

Kim, Kyoung-Yeol, et al., "Continuous Treatment of High Strength Wastewaters Using Air-Cathode Microbial Fuel Cells", Bioresource Technology 221 (2016) 96-101.

Lebrecht et al. Treating Sulfur in Wastewater. Feb. 2015 [Retrieved May 3, 2020) Retrieved from Internet URL: <http://www.airproducts.com/-/media/downloads/w/wastewater-treatmenVdata-sheets/en-treating-sulfur-in-wastewater.pdf>.

Lim, Seung J., et al., "Swine Wastewater Treatment Using a Unique Sequence of Ion Exchange Membranes and Bioelectrochemical System", Bioresource Technology 118 (2012) 163-169.

(56) References Cited

OTHER PUBLICATIONS

Lu, Mengqian, et al., "Long-term Performance of a 20-L Continuous Faw Microbial Fuel Cell for Treatment of Brewery Wastewater", Journal of Power Sources xxx (2017) 1-14.

Mann, Ethane., et al., "Pseudomonas Biofilm Matrix Composition and Niche Biology", FEMS Microbial Rev 36 (2012) 893-916.

Matlock, Marty, et al., "A Life Cycle Analysis of Water Use in U.S. Pork Production", University of Arkansas I Division of Agriculture I 78 pages (2011).

McIlroy, Simon J., et al., "Identification of Active Denitrifiers in Full-scale Nutrient Removal Wastewater Treatment Systems", Environmental Microbiology (2016) 18(1), 50-64.

Min, Booki, et al., "Electricity Generation From Swine Wastewater Using Microbial Fuel Cells", Water Research 39 (2005) 4961-4968.

Molognoni, Daniele, et al., "Multiparametric Control for Enhanced Biofilm Selection in Microbial Fuel Cells", J Chem Technol Biotechnol 2016; 91: 1720-1727.

Sander, Elisa M., et al., "Dissimilatory Nitrate Reduction to Ammonium as an Electron Sink During Cathodic Denitrification", RSC Adv.,2015, 5, 86572-86577.

Tharali, Akshay D. et al., "Microbial Fuel Cells in Bioelectricity Production", Frontiers in Life Science, 2016—vol. 9, No. 4, 252-266SSN: 2155-3769 (Print) 2155-3777 (Online) Journal homepage: http://www.tandfonline.com/loi/tfls20.

Van Den Berg, Eveline M., et al., "DNRA and Denitrification Coexist over a Broad Range of Acetate/N-NO3- Ratios, in a Chemostat Enrichment Culture", Frontiers in Microbiology I www.frontiersin.org—Nov. 2016 I vol. 7 I Article 1842—13 pages.

Van Lier, Jules B., et al. "Anaerobic Wastewater Treatment", Biological Wastewater Treatment: Principles Modeling and Design—2008—ISBN 9781843391883.

Vilajeliu-Pons, Anna, et al., "Microbiome Characterization of MFCs Used for the Treatment of Swine Manure", Journal of Hazardous Materials 288 (2015) 60-68.

Virdis, Bernardino, et al., "Microbial Fuel Cells for Simultaneous Carbon and Nitrogen Removal", Water Research 42 (20 08) 3013-3024.

Wallace, Mark. Tackling the water crisis will be just as hard as it sounds: As entrepreneurs grapple with water sustainability, they find big challenges lie beneath the surface. Mar. 22, 2019 (Retrieved on Feb. 11, 2020, retrieved from the internet URL: www.fastcompany.com/90323352/tackling-the-water-crisis-will-be-just-as-hard-as-it-shounds. pp. 1-13.

Winfield, Jonathan, et al., "Investigating the Effects of Fuidic Connection Between Microbial Fuel Cells", Bioprocess Biosyst Eng (2011) 34:477-484.

Zhuang, Li, et al., "Scalable microbial Fuel Cell (MFC) Stack for Continuous Real Wastewater Treatment", Bioresource Technology 106 (2012) 82-88.

Zhuang, Li, et al., "Substrate Cross-Conduction Effect on the Performance of Serially Connected Microbial Fuel Cell Stack", Electrochemistry Communications 11 (2009) 937-940.

\* cited by examiner

UPPER ISOMETRIC VIEW

LOWER ISOMETRIC VIEW

US 11,552,322 B2

BRANCHED ANODES FOR MICROBIAL FUEL CELLS

CROSS-REFERENCE TO RELATED APPLICATIONS

This patent document claims priorities to and benefits of U.S. Provisional Patent Application No. 62/702,544 titled "BRANCHED ANODES FOR MICROBIAL FUEL CELLS" filed on Jul. 24, 2018. The entire content of the aforementioned patent application is incorporated by reference as part of the disclosure of this patent document.

TECHNICAL FIELD

This patent document relates to microbial fuel cell technology.

BACKGROUND

A microbial fuel cell (MFC) is a bioelectrochemical system that uses living cells, such as bacteria, and mimics and/or promotes their natural interactions to produce electric current. Some example MFC systems include mediated MFCs, which use a mediator for transferring electrons from the bacteria cell to the anode. Other MFC systems include unmediated MFCs, which utilize types of bacteria that typically have electrochemically active redox proteins (e.g., cytochromes) on their outer membrane that can transfer electrons directly to the anode.

SUMMARY

Disclosed are branched anodes for modular microbial fuel cell (MFC) devices, systems and methods for treating wastewater and generating electrical energy through a bioelectrochemical waste-to-energy conversion process.

In some aspects, an anode electrode includes a plurality of sheets of a conductive textile material, wherein each of the plurality of sheets includes a stem portion and a plurality of branch portions integrally coupled to the stem portion; and a conductive core, wherein the plurality of sheets are wound around the conductive core and the branch portions of the plurality of sheets extend away from the conductive core.

In some aspects, a method of producing an anode electrode includes providing a plurality of sheets of a conductive textile material; cutting each of the plurality of sheets to form a stem portion and a plurality of branch portions integrally connected to the stem portion; stacking the plurality of sheets together; and winding the stack of the plurality of sheets around a conductive core.

In some aspects, a device for wastewater treatment and energy generation includes a microbial fuel cell (MFC) device operable to bioelectrochemically process wastewater by concurrently generating electrical energy and digesting organic contaminants and particulates in the wastewater to yield a treated water, the MFC device comprising a housing, a cathode assembly including two cathode electrodes separated on two sides of the housing, and an anode assembly including an anode plate and a plurality of anode electrodes attached to the anode plate, the anode assembly positioned within the housing and in electrical connection with the cathode assembly, wherein an individual anode electrode comprises a plurality of sheets of a conductive textile material stacked together and wound around a conductive core.

The subject matter described in this patent document can be implemented in specific ways that provide one or more of the following features.

DETAILED DESCRIPTION

Figure 1:
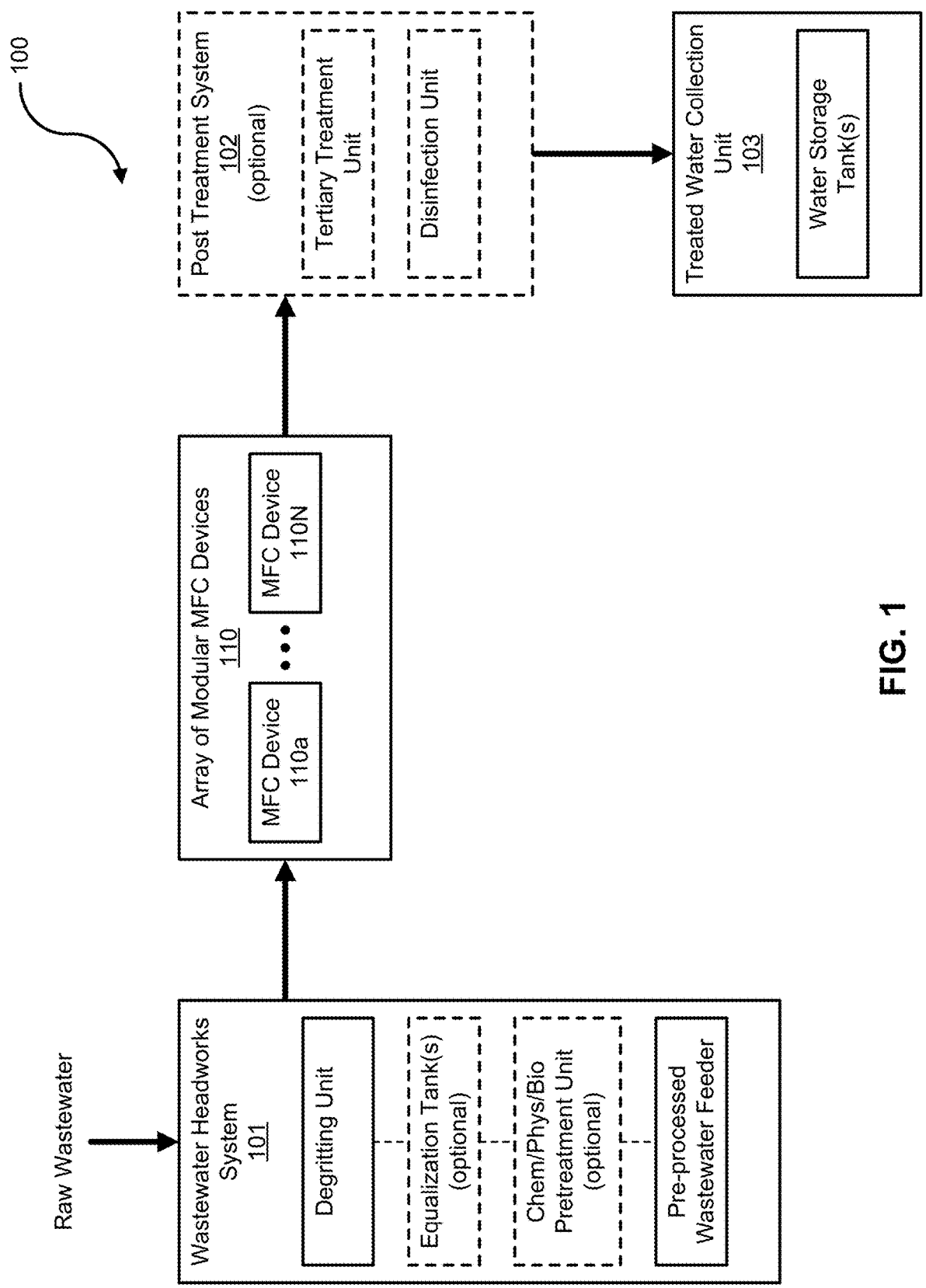
FIG. 1 shows a diagram of an example embodiment of a modular microbial fuel cell (MFC) system in accordance with the present technology for net-zero energy consuming wastewater treatment.

Microbial fuel cells (MFCs) use microbes as catalysts to oxidize organic matter at the anode, and generate electricity via extracellular electron transfer (EET) mechanisms. MFC technology development has benefited from major discoveries related to EET mechanisms of model organisms and critical design evaluations, but have lacked progress in the transformation from lab scale fundamental experiments to large scale industrial implementations.

While MFC technology has shown promise in the research phase, further advancements are needed before MFC systems can be applied to real wastewater treatment applications. For example, early MFC research has been primarily conducted in small lab-scale systems using liquid volumes less than 1 L, operated in fed-batch mode for short-term tests, or fed synthetic or well-defined wastewater as a test solution. Yet, to demonstrate practical wastewater treatment, large-scale MFC systems are needed to treat real wastewater under continuous flow operation over longer time scales outside of a laboratory setting. Further, commercially viable MFC systems should have a low cost of fabrication, distribution and installment, as well as long-term operational reliability and durability.

Such large-scale systems are needed for many types of applications. For example, in farming and livestock, significant volumes of wastewater are accumulated and discharged in the sewer during the daily washing and sanitation of animal quarters, such as pens for pig farms. During these processes a vast amount of freshwater is consumed. For example, approximately one quarter of global freshwater is used for animal production. According to a 2011 report by the Pork Checkoff organization, a given swine farm may use 24% of its total water consumption for facility operations such as cooling the animals and manure management. The most common method of manure management at swine production operations is to capture the wastewater in large anaerobic lagoons. However, if not properly lined or maintained, these lagoons may lead to hazardous discharge causing severe environmental impacts due to the release of high concentrations of carbon, nitrogen and phosphorous, and the presence of potentially pathogenic bacteria. Yet, alternative treatment methods that accelerate the removal of carbon and nitrogen from swine wastewater could enable water reuse for farm cleaning and/or irrigation while simultaneously preventing environmental pollution.

Disclosed are modular microbial fuel cell (MFC) devices, systems and methods for treating wastewater and generating electrical energy through a bioelectrochemical waste-to-energy conversion process. The disclosed MFC devices, systems and methods can be used for a wide variety of environmental and clean-energy applications on a large, medium or small scale.

Also disclosed are example embodiments and implementations of branched anodes for high-treatment rate modular MFC devices and methods, which can be employed for large-scale applications for wastewater treatment with net-zero energy demands, remote monitoring and high percentage of solids reduction or elimination.

Implementations of the disclosed modular MFC technology can include one or more of the following features and advantages. Example embodiments of the MFC devices include modular components that can be integrated into a single, transportable casing for onsite 'plug-and-play' installation for a variety of end-use implementations, including wastewater treatment, sludge elimination, and electricity generation. The disclosed modular MFC technology can be used to save end-users up to 95% on wastewater treatment operation costs based on net-zero energy operation of the device, remote monitoring capability, and 80% solids reduction.

Example embodiments and implementations of the disclosed devices, systems and methods in accordance with the disclosed modular MFC technology are described. While some of the examples described below are primarily based on treating domesticated animal wastewater or brewing wastewater using certain example embodiments of the modular MFC devices and/or their components to facilitate understanding of the underlying concepts, it is understood that the disclosed embodiments can also include treatment of other wastewater at high treatment rates from other sources in addition to farms or breweries.

FIG. 1 shows a diagram of an example embodiment of a modular MFC system 100 in accordance with the present technology for net-zero energy consuming wastewater treatment of diverse types of wastewater, including sewage from domestic infrastructure systems, agricultural and industrial systems. The modular MFC system 100 includes a wastewater headworks system 101 configured to pre-treat raw wastewater (e.g., remove solid particles) and produce a pre-treated wastewater that is provided to one or more modular microbial fuel cell (MFC) devices 110, which can be configured in an array of MFC devices 110a ... 110N, to bioelectrochemically process the pre-treated wastewater by concurrently generating electrical energy and digesting organic contaminants and particulates in the pre-treated wastewater that yields a treated water.

The wastewater headworks system 101 can receive raw wastewater for treatment, e.g., from a facility such as a farm or an urban sewage wastewater grid, industrial processing facility, or other, and pre-process the raw wastewater to be provided to the one or more modular MFC devices 110, as discussed further below. For example, the wastewater headworks system 101 can pre-process the raw wastewater by removing solid or solid-like matter in the raw wastewater, e.g., of a relatively large size or mass. For example, the wastewater headworks system 101 can remove particles of 1 cm or greater and/or 50 g or greater.

In the example embodiment shown in FIG. 1, the wastewater headworks system 101 includes a degritting unit (also referred to as degritting module, degritting subsystem, or degritter) that filters out matter of large size and/or large mass in the raw wastewater, e.g., like stones, sand, etc. In some embodiments, for example, the degritting unit can include a spinning device that uses centrifugal force to separate out sand, grit and gravel, e.g., via spin filters, which can be collected and disposed as solid waste from the degritting unit. In some implementations, the degritting unit can include a mesh sheet to separate the solid matter from the wastewater stream. In some embodiments, the wastewater headworks system 101 includes one or more equalization tanks configured to receive and collect the degritted wastewater and provide a steady organic load and flow of the received wastewater out of the wastewater headworks system 101 via a pre-processed wastewater feeder box, e.g., to the modular MFC devices 110. In some embodiments, the wastewater headworks system 101 includes one or more chemical/physical or biological pre-treatment units configured to receive the degritted wastewater, e.g., from the degritting unit or the equalization tank(s), and process the degritted wastewater to remove any unwanted chemical species, such as sulfur species or grease and oil for example. In some embodiments, the wastewater headworks system 101 includes a feeder unit to provide the pre-processed wastewater to the next stage of the modular MFC system 100. For example, the pre-processed wastewater feeder can be configured as a feeder box. In some embodiments, the example feeder box is arranged at a greater height than the modular MFC devices 110.

The system 100 includes one or more modular MFC devices 110. In the example show in FIG. 1, the system 100 includes an array of the modular MFC devices 110 configured to treat the pre-processed wastewater through a net-zero energy consumption and bioelectrochemical waste-to-energy conversion process generating electrical energy and digesting organic contaminants and particulates (e.g., sludge) in the pre-processed wastewater to yield treated water. The bioelectrochemical conversion process implemented by the modular MFC devices 110 includes biological oxidation accompanied with an extracellular transfer of electrons released during the oxidation to a conductive electrode surface/anode. The electrons are then transferred through an external electrical circuit to a cathode where a reduction process occurs. The overall conversion process is spatially separated into an oxidation via bacteria at the anode and a reduction process at the cathode.

The example array of modular MFC devices 110 can be arranged in a series of 1 to N MFC devices 110, which can be referred to as a treatment train. In some embodiments, the treatment train is an array of hydraulically connected MFC devices 110 (arranged in a series of 1 to N MFC devices), of which a first MFC device 110*a* receives the pre-processed wastewater from the wastewater headworks system 101, processes the pre-processed wastewater by the bioelectrochemical conversion process and outputs the partially treated wastewater to a second MFC device 110*b*, which receives the processed output water from the first MFC device 110*a* and processes the first MFC device 110*a*'s output water by the bioelectrochemical conversion process to output from the array (if N=2 MFC devices) or to another MFC device of the array, e.g., a third MFC device 110*c*, and so forth, until the final MFC device 110N. In some embodiments of the system 100, the pre-processed wastewater is gravity-fed from the feeder of the wastewater headworks system 101 to the array of modular MFC devices 110. For example, in various implementations, the pre-processed wastewater is gravity-fed through the utilization of a feeder box and a peristaltic pump is used at the end of the MFC array to control the flow rate through the MFC device(s) 110.

In some embodiments, the system 100 includes multiple treatment trains (e.g., two or more arrays of modular MFC devices 110 in series, e.g., a hydraulic series), which can treat the pre-processed wastewater in parallel to increase treatment volume. In some embodiments, the modular MFC devices 110 of a single treatment train can be arranged in one plain or in multiple vertical plains to create multiple levels. In various embodiments, a treatment train can include the same number or a different number of modular MFC devices 110 as another treatment train, e.g., where treatment train 1 has N modular MFC devices 110 and treatment train 2 has N or M modular MFC devices 110. For example, in instances where the system 100 includes the same number of modular MFC devices 110 among multiple treatment trains configured in parallel (from a common wastewater intake point), this can advantageously allow the system to distribute the wastewater processing volume load to the individual MFC devices among each treatment train group when the treatment trains produce similar treatment water outputs of similar qualities or level of cleanliness. Also, for example, in instances where the system 100 includes different numbers of modular MFC devices 110 among treatment trains configured in parallel (from a common wastewater intake point), this can advantageously allow the system to produce different treatment water outputs of different qualities or levels of cleanliness.

In some embodiments, like the example of FIG. 1, the modular MFC system 100 includes a water collection system 103 to receive the treated water from the array of the modular MFC devices 110, which can store the treated water and/or route the treated water to an external device or system for use of the water treated by the system 100. In some embodiments, the water collection system 103 includes one or more water tanks to store the treated water, which can later be routed to the external device or system. In some embodiments, the system 100 includes a post-treatment system 102 arranged between the array of the modular MFC devices 110 and the water collection system 103 to post-treat the treated water, such as disinfect the treated water or implement other tertiary treatment processes. In some embodiments, for example, the post-treatment system 102 can include one or more membranes to post-treat the treated water using reverse or forward osmosis, advanced oxidation, denitrification, and/or disinfection, e.g., using ozone, ultraviolet light, chlorine or other disinfection approaches.

In some example embodiments, like the system shown in later in FIG. 9, the modular MFC system 100 can include a plurality of MFC reactors (e.g., twelve MFC reactors, with a total volume of 90 L, collectively) that be installed at an installation site to treat wastewater from a wastewater source, where one of many examples includes wastewater at a farm. In some example embodiments, the modular MFC system 100 can be contained in a portable container or placed on a mobile rack structure that can be easily transported to and installed at the designated installation site for treatment of domestic, agricultural or industrial wastewater.

Figure 2A:
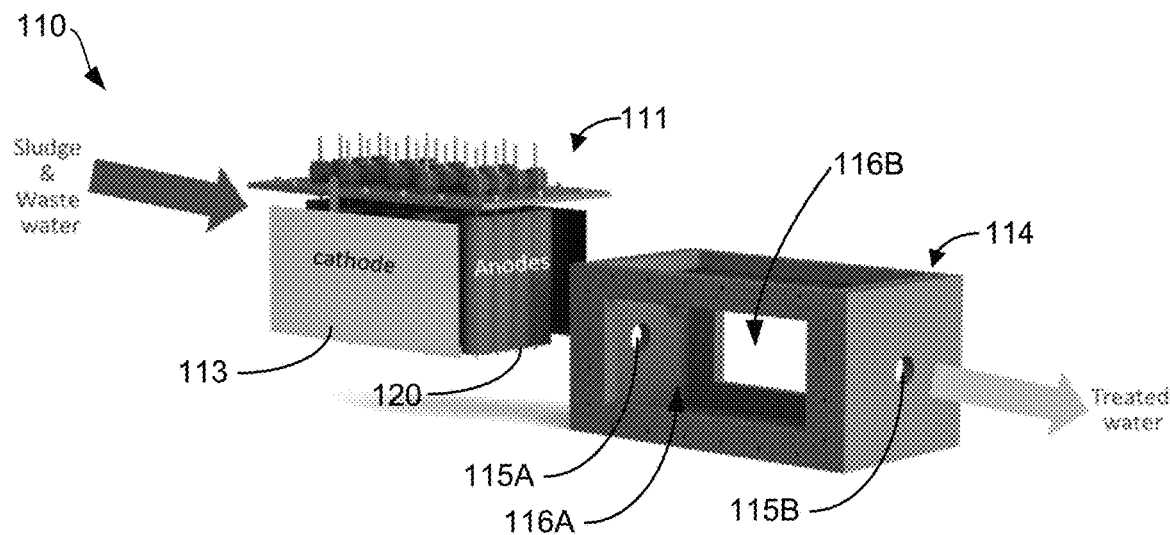
FIGS. 2A and 2B show diagrams of an example embodiment of an MFC device of the array of the MFC devices shown in FIG. 1.
Figure 2B:
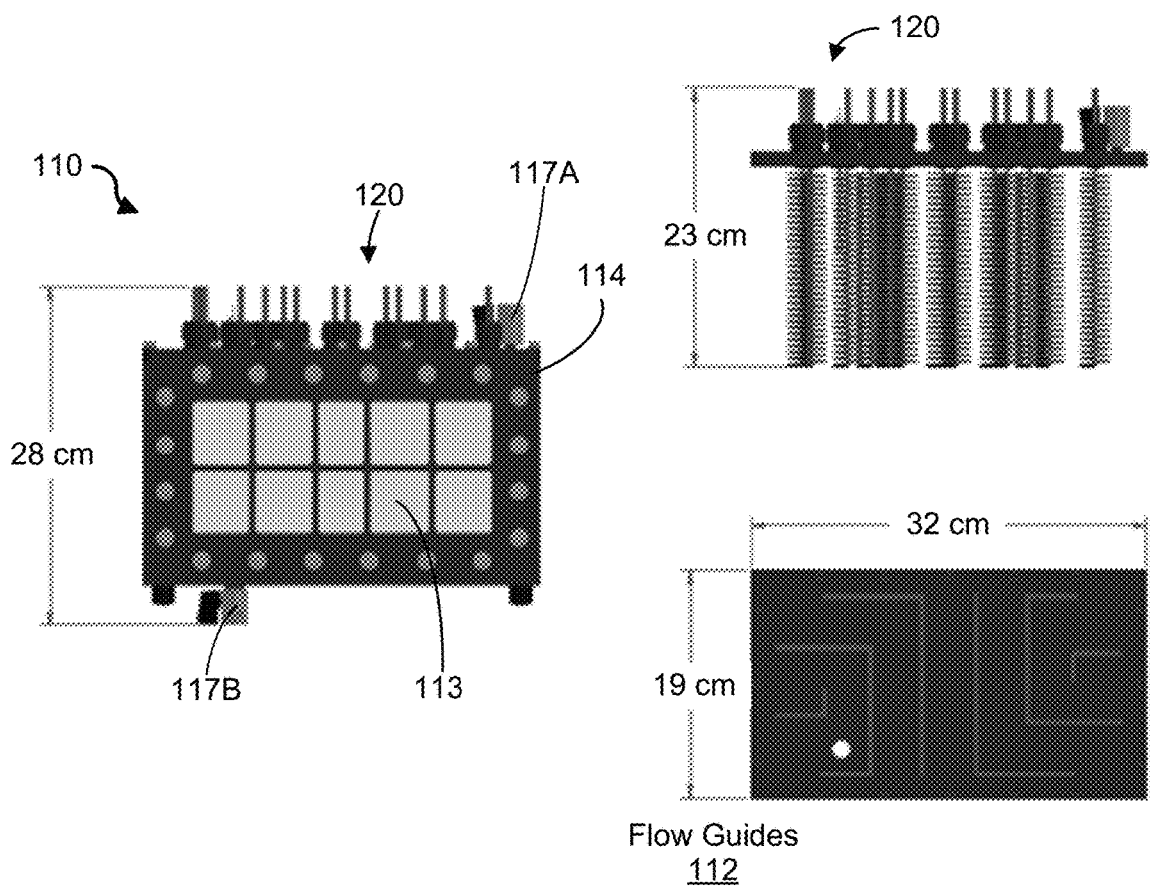

FIGS. 2A and 2B show diagrams of an example embodiment of an MFC device 110 of the array of the system 100. As shown in FIG. 2A, the MFC device 110 includes a bioelectrochemical reactor core 111 and a housing 114 to encase the reactor core 111. The reactor core 111 can be configured as a single module device with an anode assembly 120 and the cathode assembly 113. In some embodiments, the housing 114 includes a rigid casing having a solid bottom and an opening at the top to allow modular components of the reactor core 111 to be reversibly positioned within the interior of the housing 114. In some embodiments, the housing 114 is structured to have a first dimension in a flow direction of the wastewater through the MFC device 110, which is configured to be longer than a perpendicular dimension of housing 114. In the example shown in FIG. 2A, the housing 114 includes an input port 115A and output port 115B arranged on opposing sides of the housing 114 along the flow direction. During operation of the MFC device 110, wastewater can flow into the reactor housing 114 of the MFC 110 by passing through the input port 115A and, after being treated by the reactor 111, can flow out of the reactor housing 114 by passing through the output port 115*b*. The example housing includes two openings 116A and 116B on opposing sides of the housing 114 that are adjacent (and perpendicular in rectangular configurations of the housing 114) to the sides having the ports 115A and 115B. The openings 116A and 116B allow for air flow through the cathode assembly 113 encased in the housing 114. In the example shown in FIG. 2A, the housing 114 includes an access opening on top that is closed by an attachment plate to which the anode assembly 120 is attached.

Figure 3A:
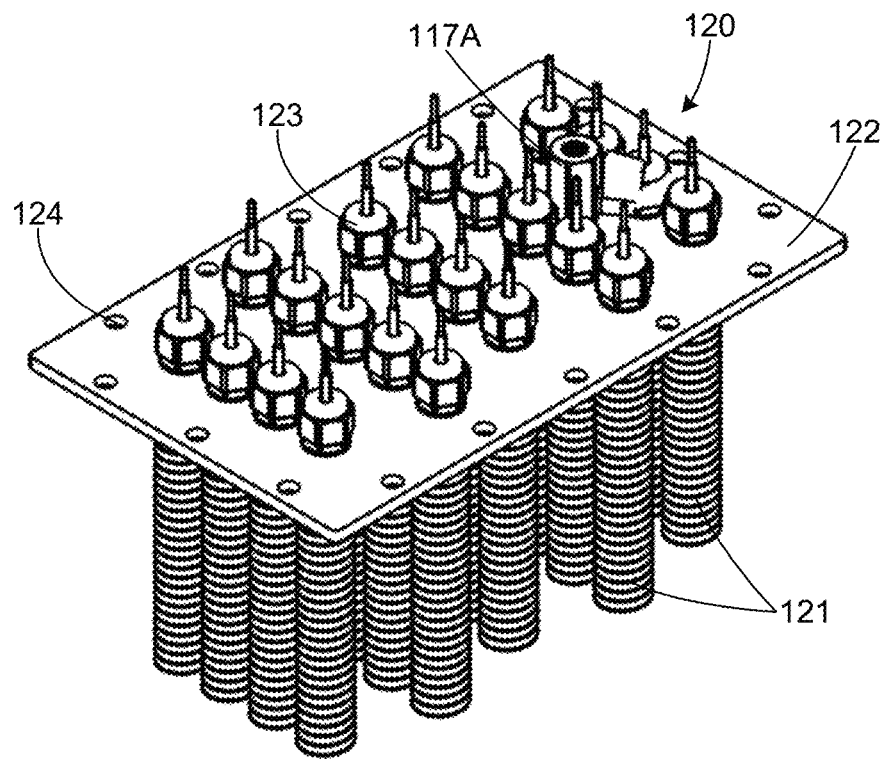
FIG. 3A shows an isometric view of an example embodiment of an anode assembly that can be used in the MFC device shown in FIGS. 2A and 2B.
Figure 3B:
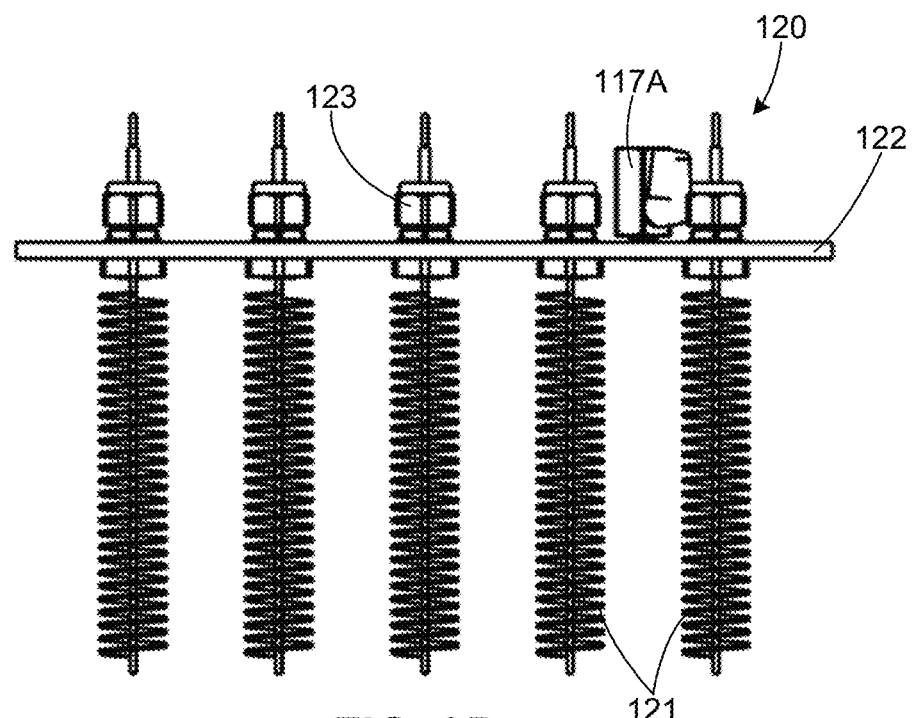
FIG. 3B shows an elevation side view of the anode assembly shown in FIG. 3A.
Figure 3C:
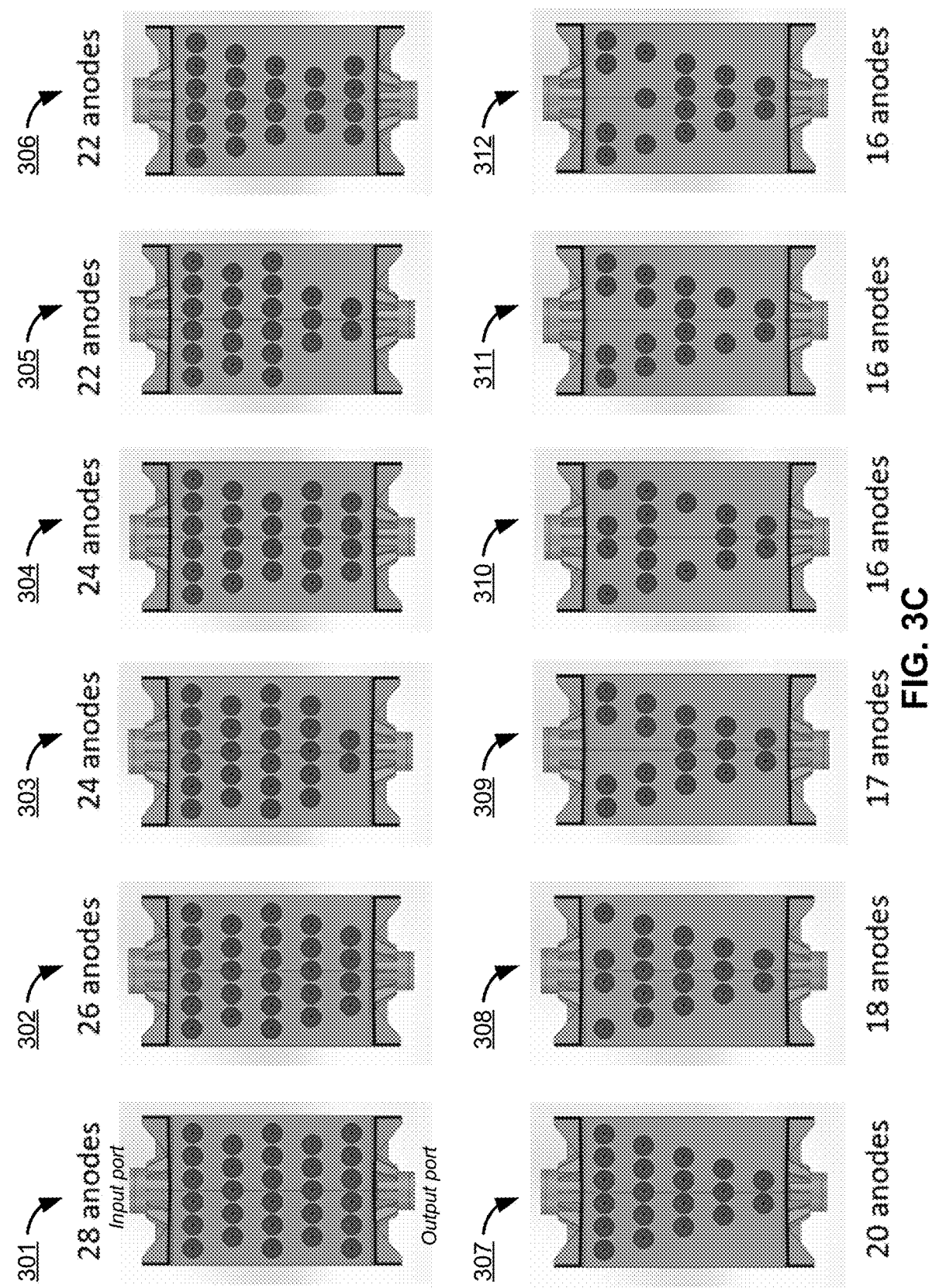
FIG. 3C shows a diagram illustrating various examples of anode plates arrangements able to couple a variety of different numbers of electrodes coupled to the anode plate.
Figure 3D:
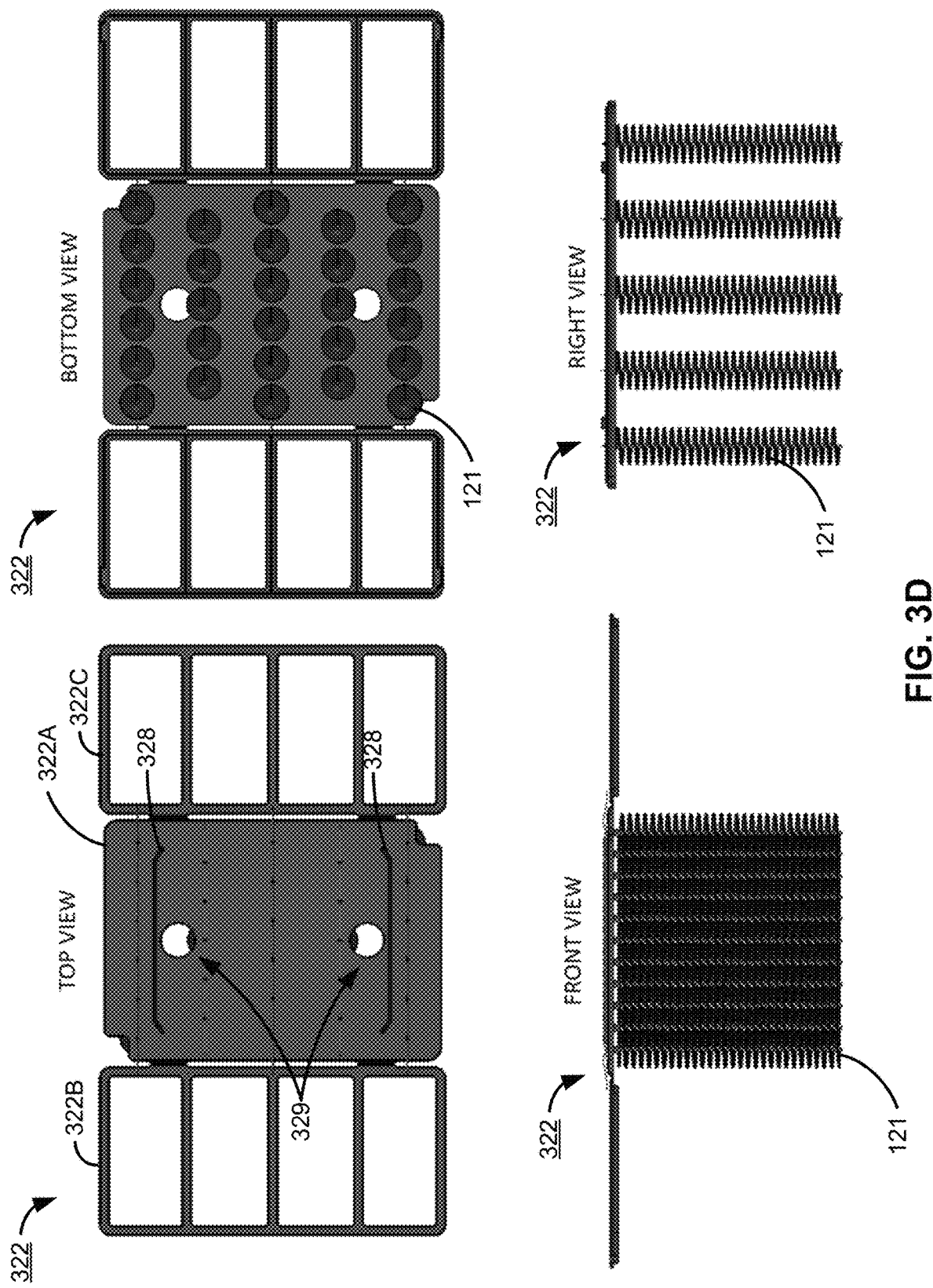
FIG. 3D shows a top view, bottom view, front view and right-side view of an example embodiment of an anode plate coupled to example anodes in accordance with the present technology.
Figure 3E:
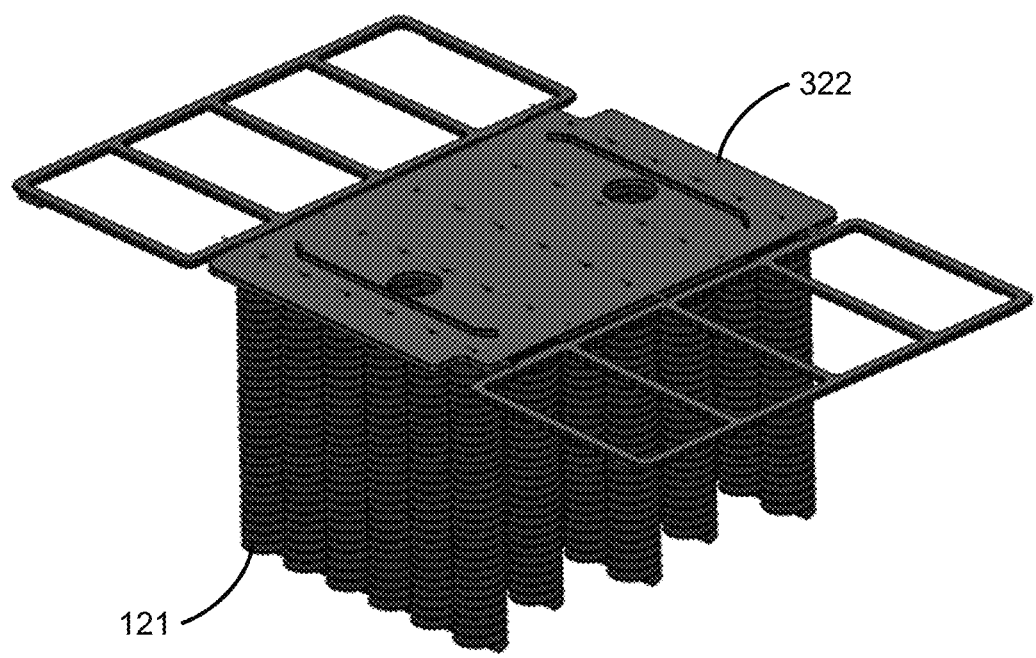
FIG. 3E shows isometric views from an upper and a lower perspective of the example embodiment of the anode plate and anodes shown in FIG. 3D.
Figure 3E:
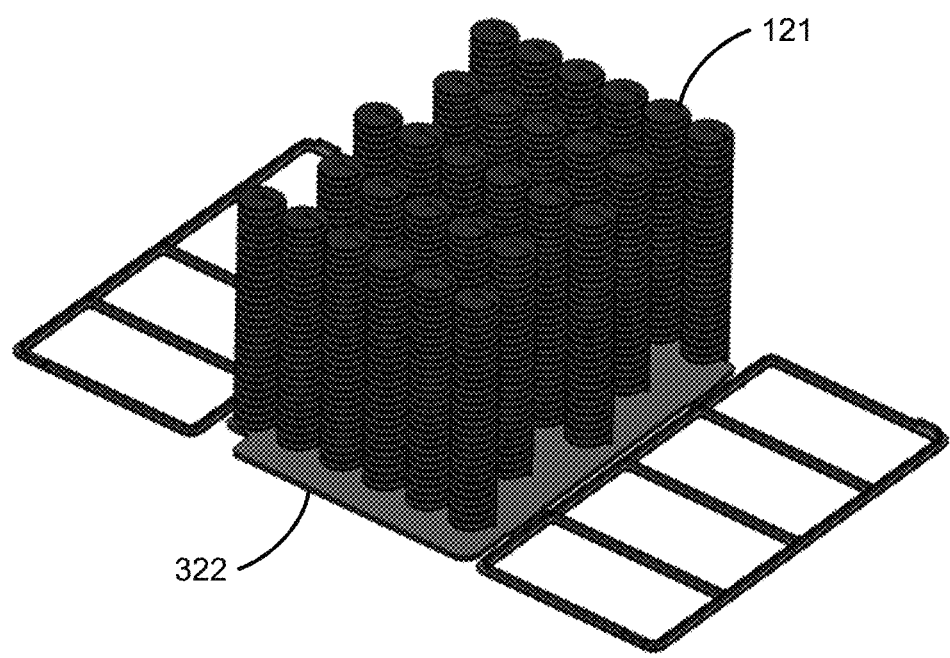
Figure 3F:
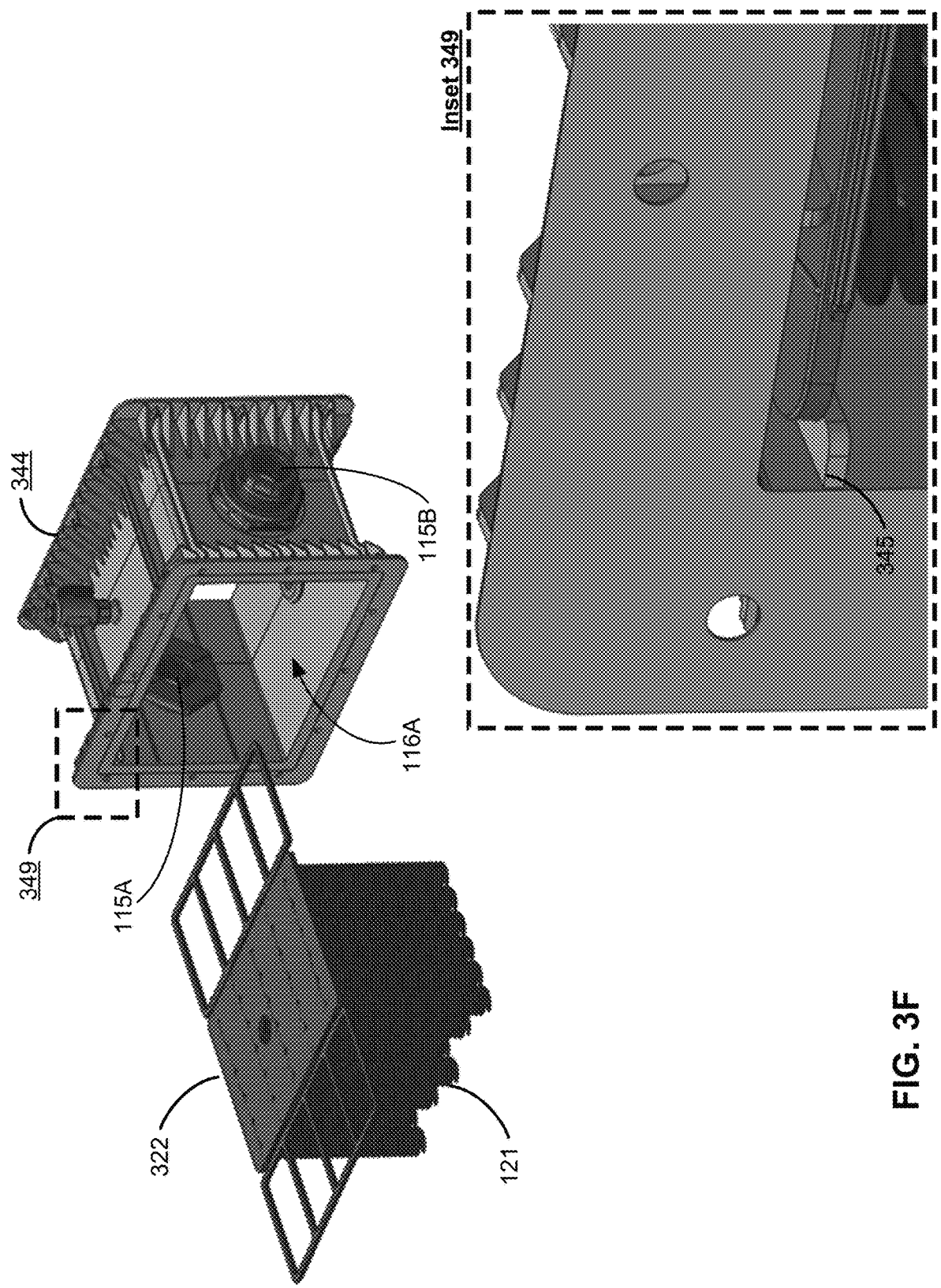
FIG. 3F shows a three-dimensional view of the example embodiment of the anode plate and anodes shown in FIG. 3D disposed in an example embodiment of a housing of an MFC device in accordance with the present technology.

In some embodiments, the housing 114 can be closed on top to form a whole body, in which the input port 115A and the output port 115B are positioned on short side walls orthogonal to the longer dimension, and the openings 116A and 116B are positioned on long side walls orthogonal to the shorter perpendicular dimension (an example of which, housing 344, is shown in FIG. 3F).

In some embodiments, the housing 114 may include one or more valves 117 (shown in FIG. 2B as valves 117A and 117B) coupled to opposing top and bottom surfaces of the MFC device 110. In implementations, for example, the valve 117B can be used to clean and flush out residual waste material that remains within the housing 114. The valve 117A can provide degassing of the MFC device 110, e.g., in the event of gas production during operation. In some embodiments, the example MFC device 110 can include one or more valves 117 to allow gas to exit the reactor and/or one or more drain valves 117 to allow for the reactor to be drained of liquid to allow for servicing, transporting, or removing a reactor from a system.

As shown in FIGS. 2A and 2B, the cathode assembly 113 includes two cathode electrodes arranged on the sides of the reactor proximate to openings (e.g., openings 116A and 116B) that align with the sides of the housing 114. The inner side of each of the cathodes is exposed to the wastewater solution fed into the reactor core 111. The reactor core 111 includes the anode assembly 120 comprising a plurality of anode units that are arranged between the cathode electrodes of the cathode assembly 113, and which are in the flow direction between the input port 115A and output port 115B when the reactor core 111 is encased in the housing 114.

In the anode assembly 120, for example, individual anode units can be spatially arranged and electrically connected with each other to form an anode, in which one or more anode units can operate as a single anode system. The anode assembly 120 can include a plurality of the single anode systems. In some embodiments, the individual anode units can be identical to one another within a respective single anode system. In some embodiments, the individual anode units can be different from one another in a single anode system and/or to other anode units in other single anode systems. In some embodiments, the anode units can be vertical assemblies of anode electrodes, which can include carbon or other materials that provide surface area for microbial (e.g., bacteria) growth. The anode units of a single anode system can be electrically connected outside or inside the reactor core 111. Within a single anode system, the anode units can be connected in electrical series from anode unit 1 to anode unit N, e.g., via wire. The wire(s) can be titanium, platinum or palladium wire, for example. In some embodiments, within the anode system, the anode units can be connected in parallel or a combination of series and parallel.

In some examples, the MFC device 110 has a rectangular shape with internal dimensions: 31±2 cm×17±2 cm×15±2 cm, and volume of 8±3 L. In the example embodiment shown in FIGS. 2A and 2B, the anode assembly 120 includes twenty-two anode units, which can be engineered as carbon anode units (e.g., of graphite fiber) and structured to have a 10 cm height and 2.5 cm diameter. Other heights and diameters can also be used.

In some embodiments, at least some of the anode units of the anode assembly 120 are electrically connected together as one electrode. In various implementations, for example, the anode units can be pre-treated before configuration in the reactor core 111 to remove organic contaminants or activate the anode surface, e.g., such as by soaking in an organic solvent and subsequently washing with water. Notably, for example, based on the modular design of the reactor core 111, the anode units of the anode assembly 120 can be washed in such fashion before or after installation of the MFC device 110 and the system 100 at the implementation site.

In some examples, like the example embodiment shown in FIGS. 2A and 2B, the cathode assembly 113 includes two gas-diffusion cathodes, each of a size of 13.5 cm×27.2 cm, with geometric surface area 367 $cm^2$. Other sizes and with other surface areas may also be used. The example gas-diffusion cathodes are placed on both sides of the reactor core 111 and electrically connected. As shown in FIG. 2B, the example MFC device 110 includes flow guides 112 that can be built as part of the housing 114 to integrate into the reactor core 111 to direct flow of the solution inside the reactor core 111. In some implementations, for example, the flow guides 112 are solid static walls, which can be a part of the reactor housing 114 or additionally inserted before the placement of the reactor 111. The flow guides 112 can be placed in a specific arrangement to direct the flow, provide proper mixing and higher proton supply at the cathodes.

Figure 2C:
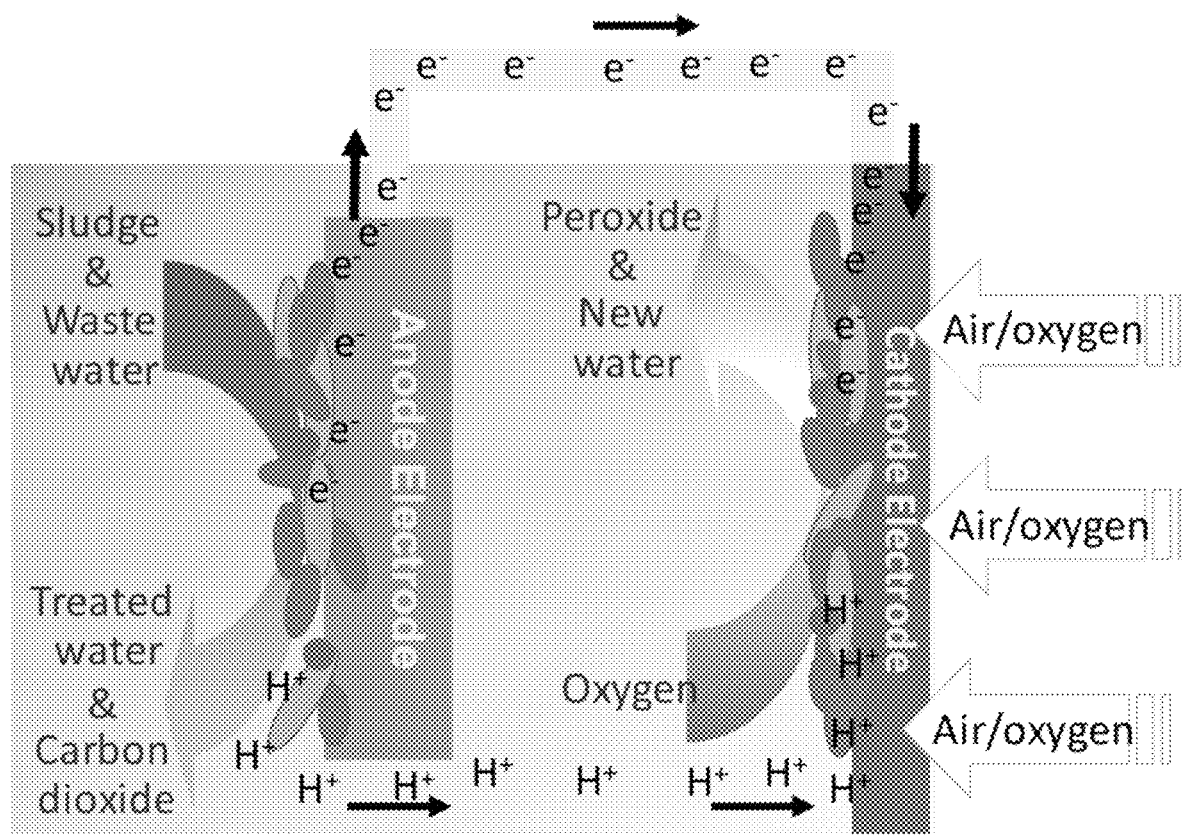
FIG. 2C shows an illustrative diagram of a bioelectrochemical waste-to-energy conversion process in accordance with the present technology.

FIG. 2C shows an illustrative diagram of a bioelectrochemical waste-to-energy conversion process implemented by a reactor core of an example modular MFC device 110. As shown by this example, a biologically catalyzed oxidation of organic matter to dissolve carbon dioxide occurs at an anode electrode of an anode unit (e.g., of the anode assembly 120). The biological species performing the oxidation process include, for example, bacteria, yeast or other microorganisms. These microorganisms can be a pure culture or a whole microbial community. During the oxidation of the organic matter, the given microbes perform extracellular electron transfer to the anode surface and excretion of protons in solution, as illustrated in the diagram of FIG. 2C. The released electrons travel through an external wire to a cathode electrode (e.g., of a cathode plate of the cathode assembly 113). Protons diffuse from the anode surrounding to the cathode and oxygen passively diffuses through the cathode from air. Protons, electrons and oxygen interact at the cathode surface and oxygen is reduced to hydrogen peroxide or new molecular water. The flow of electrons provides a source of energy generation, which can be harvested by the system 100 as one of the results of the bioelectrochemical process, where the other result is cleaner water that is outputted from the reactor. The modular MFC devices 110 generate electricity as DC current, which can be stored in an electrical charge storage device (e.g., a battery). For example, an electrical circuit configured between the anode and cathode can be used to trickle charge batteries. In various implementations of the system 100, the harvested and/or stored energy can be used to power pumps that can offset the power demand of system 100, e.g., such as pump 906 and/or pump 907 shown in FIG. 9.

In the bioelectrochemical waste-to-energy conversion process, the microbial fuel cells utilize biological catalysts to convert the chemical energy contained in waste organic compounds into direct electricity. The oxidation of waste organics and electricity conversion occurs at the anode electrode, where microbial communities form a biofilm on the anode surfaces and oxidize waste organics at the biofilm-liquid interface. Microbes recover the energy as electricity through extracellular electron transfer processes, whereby microbes move electrons from inside the cellular membranes to outside of the cellular membranes to provide respiration. The materials, surface properties, and design of anode electrodes must be optimized to support maximum biofilm activities, e.g., both oxidation and extracellular electron transfer.

For example, for the anode assembly 120, high surface area-to-volume (SA/V) electrodes constructed from highly conductive materials with optimized surface properties for microbial adhesion are employed. Also, the electrodes for the anode assembly 120 are designed to support mass-transport and efficient delivery of ions and carbon sources to and from the biofilm/liquid interfaces at the anode surface.

Moreover, the anode electrodes are designed to be simple and cost-effective for manufacture.

Example embodiments and implementations of anode electrodes for the anode assembly 120 that address these and other issues are described below.

FIGS. 3A and 3B show diagrams of an example embodiment of the anode assembly 120 that can be used with the MFC device 110. The anode assembly 120 includes a plurality of electrodes 121 positioned within holes formed in an anode plate 122. An anode holder 123 that is attachable to the anode plate 122 securely couples the electrodes 121 to the anode plate 122 so that the electrodes 121 do not detach from the anode plate 122 and so that wastewater within housing 114 does not leave the housing 114 by passing through the holes in which the electrodes 121 are positioned.

In some embodiments, for example, the anode holder 123 includes two pieces: a first piece that couples around a conductive core (e.g., a rod or post) of the branched anode that is positioned on one side of the anode plate 122 (i.e., within the reactor chamber of the housing 114), and a second piece that couples with the first piece from the opposite side of the anode plate 122 to hold the first piece of the anode holder 123 attached to the anode plate 122. The first piece of the anode holder 123 has a hole for the placement of the main conductive post of the branched anode that protrudes through the hole of the anode plate 122. The first and second pieces of the anode holder 123 can contact each other on the opposing sides of the anode plate 122. In some embodiments, for example, the anode holder 123 can be configured as a cord fitting with the first and second pieces of the holder including a threaded cord fitting and a nut (e.g., formed of non-conducting (insulative) material, such as a polymer).

In the illustration shown in FIGS. 3A and 3B, the anode assembly 120 includes twenty-two electrodes 121, where the electrodes 121 are coupled to the anode plate 122 such that the electrodes 121 are arranged in rows having either four or five electrodes 121 per row. In other implementations, however, the anode assembly 120 can include other suitable numbers of electrodes 121 coupled to the anode plate 122 in other suitable arrangements, like in the examples of FIG. 3C. The anode plate 122 includes attachment holes 124, which can be used to securely couple the anode assembly 120 to the housing 114.

The number of anode units and their arrangement in the anode assembly 120 can be configured in a manner that addresses ionic current distribution and liquid flow distribution of the bioelectrochemical reactor.

For example, in some embodiments, the anode units are symmetrically arranged along the fluid input/output flow-direction to provide uniform ionic current distribution between the anodes of the anode assembly 120 and the cathode assembly 113. The two cathodes of the cathode assembly 113 are placed on the opposing sides of the housing 114 along the fluid input/output flow-direction, as illustrated in FIG. 2A. In some implementations, the cathodic reaction is oxygen reduction reaction, which involves the coupling of electrons coming from the anode through an external electrical wire, the protons traveling through the liquid phase in the MFC and oxygen passing through the cathode (e.g., illustrated in FIG. 2C). The symmetrical anodes arrangement along the direction of the flow provides uniform proton flux from the anode electrodes to the two cathodes of cathode assembly 113 in a direction perpendicular to the fluid input/output flow-direction.

In some embodiments, for example, an asymmetrical arrangement of anode units can be configured with addressing the liquid flow distribution, where the anode electrodes are arranged to be more densely packed towards the output of the liquid flow as opposed to the input opening of housing 114.

FIG. 3C shows a diagram illustrating various examples of anode plates arrangements able to couple a variety of different numbers of electrodes coupled to the anode plate 122. In the examples show in FIG. 3C, there are five rows of anode electrodes (e.g., such as the branched anode electrodes 121 illustrated in FIGS. 3A and 3B); yet it is understood that the anode plate 122 can include more or less rows of anode electrodes 121.

In one example, anode plate arrangement 301, the anode plate includes 28 anode electrodes symmetrically arranged in five rows, including outer rows (e.g., a first row proximate the input port and a fifth row proximate the output port) having six anodes, interior rows (e.g., a second row and fourth row) having five anodes, and a center row (e.g., third row) having six anodes. The example anode plate 301 is symmetrical in both a fluid input/output flow-direction and a perpendicular-direction to fluid input/output flow.

In other examples, anode plate arrangements 302, 303, . . . 312 include a symmetrical arrangement of anodes along the fluid input/output flow-direction. For example, the anode plate arrangement 302 includes 26 anodes arranged with six anode electrodes in the first row (proximate the input port) and the third row, five anode electrodes in the second row and the fourth row, and four anode electrodes in the fifth row (proximate to the output port). For example, the anode plate arrangement 303 includes 24 anodes arranged with six anode electrodes in the first row and the third row, five anode electrodes in the second row and the fourth row, and two anode electrodes in the fifth row (proximate to the output port). The arrangement of anode electrodes in the example anode plate arrangements 304-312 are also shown in FIG. 3C.

In some embodiments, the anode units of the anode assembly 120 are directly connected to each other in electrical connections (e.g., electrical series and/or parallel configurations) inside the reactor housing 114, which can omit the use of the anode holder 123 (and their corresponding holes for securing the anode electrodes 121 to the anode plate 122).

FIGS. 3D, 3E and 3F show an alternative design of anode plate, labeled 322. In this example, the anode plate 322 is structured to have a top plate 322A that includes an array of holes for a protruding portion of the anode electrode core to come out and connect to a core of another anode electrode. The anode plate 322 may optionally include side frames 322B and 322C, which are coupled to the top plate 322A (e.g., via hinge joint(s)) and able to move so that the side frames 322B and 322C are parallel to the cathode electrodes when the anode assembly is disposed within the housing, such as housing 344 shown in FIG. 3F. For example, the side frames 322B and 322C can serve as a support material for cathode placement and reactor assembly. The design of anode plate 322 allows for the anode assembly 120 to slide into the reactor housing 344.

In some embodiments, the anode plate 322 includes one or more holes on the top surface of the anode plate. In the example shown in FIG. 3D, one of the top surface holes 329 can be used to interface with a degassing valve and another one of the top surface holes 329 can be used for the placement of a reference electrode for configurations to implement electrochemical measurements. In some embodiments, the anode plate 322 includes spacers 328 that can keep the anode plate 322 at a certain distance from a component within or wall of the housing 344, as illustrated in FIG. 3D. In some embodiments, for example, the housing 344 includes fitting ribs 345 to hold the anode plate (e.g., anode plate 322) in place, as shown in FIG. 3F.

In some example embodiments in accordance with the present technology, the anode electrodes 121 include a branched electrode structural design in which conductive textile material 'branches' having high surface area that provides improved microbial adhesion is disposed around a conductive core (e.g., a rod or post that provides a 'trunk' of the branched anode electrode). This electrode design can also integrate into a number of different microbial fuel cell designs. In some implementations, the branched electrode can be fabricated from sheets of conductive textiles that are cut to have a single central stem with attached branches that are then stacked and wound around a conductive core, e.g., discussed in FIG. 5A.

Figure 4:
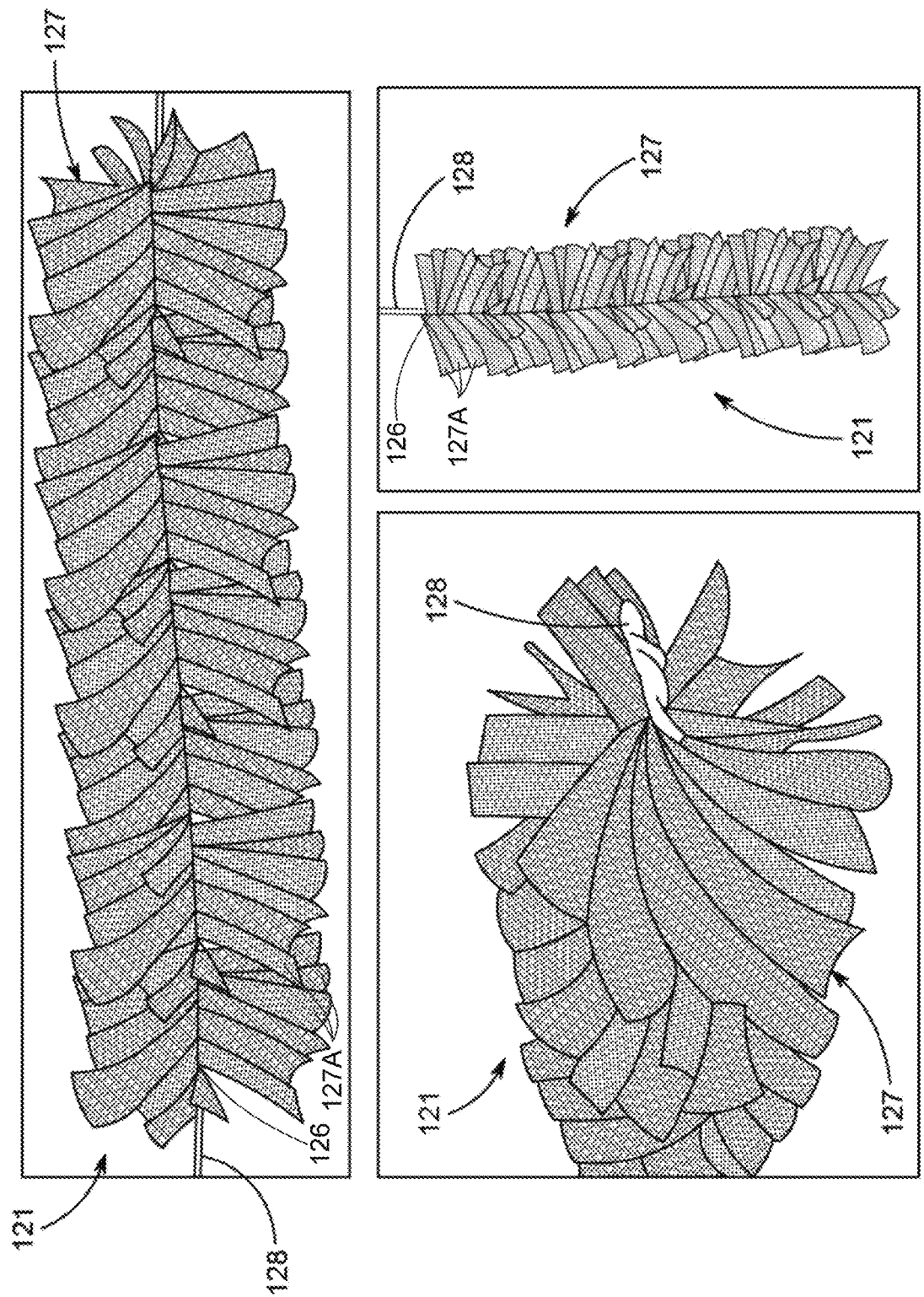
FIG. 4 shows various views of an example embodiment of a branched electrode of the anode assembly in accordance with the present technology.
Figure 5A:
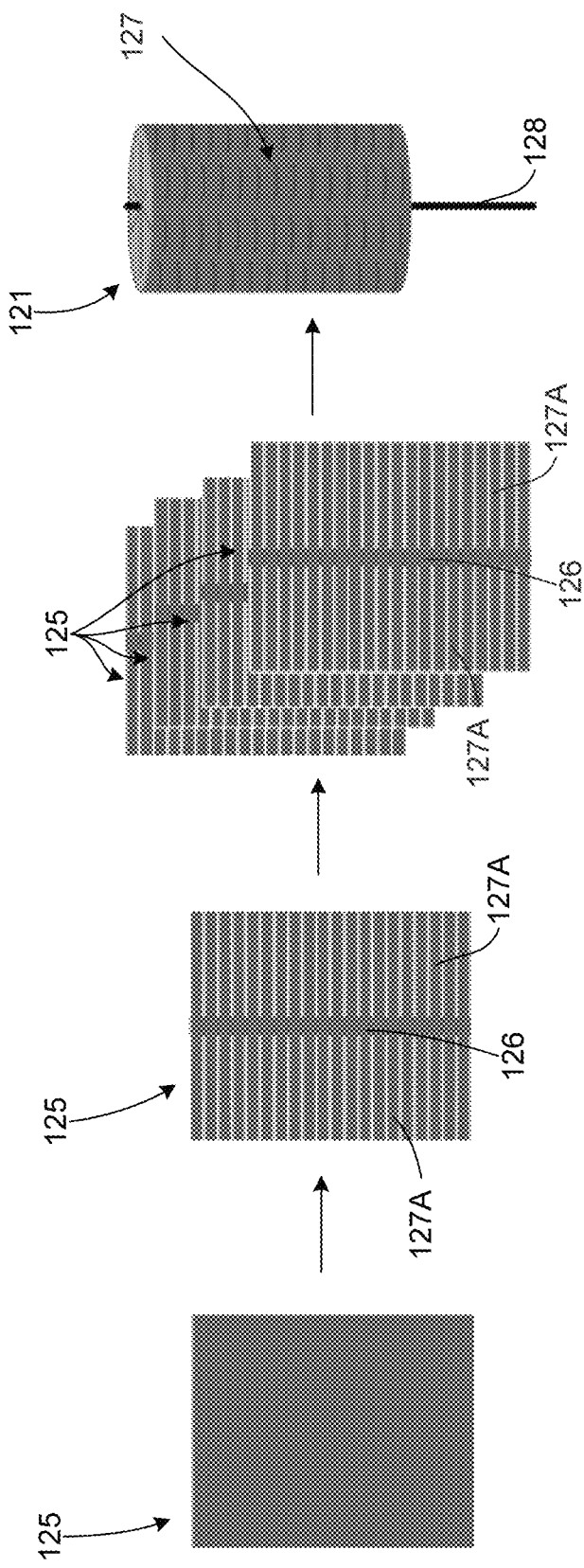
FIG. 5A shows a diagram of an example of a method of manufacturing the example branched electrode shown in FIG. 4.
Figure 5B:
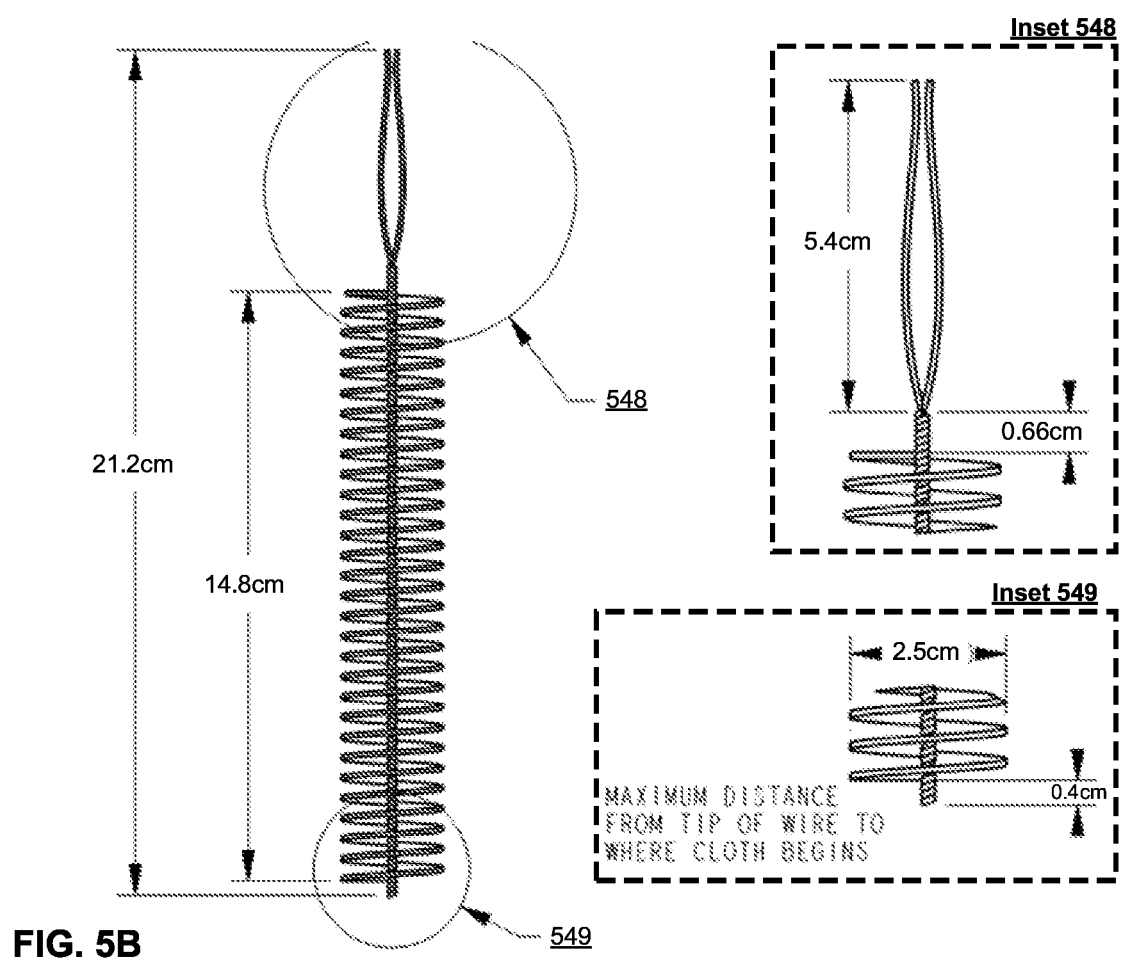
FIG. 5B shows a diagram of an example embodiment of a branched electrode of the anode assembly in accordance with the present technology.

FIGS. 4, 5A and 5B show images and diagrams depicting example embodiments of a branched anode and fabrication method of producing branched electrodes in accordance with the present technology.

Referring to FIG. 4, an example branched anode electrode, labeled 121, can include a conductive core 128 from which a plurality of electrically conductive sheets 127 (of a conductive textile material) are wound around the conductive core 128. In some embodiments, the conductive textile material includes a woven carbon material. For example, the woven carbon material can include carbon fiber. Referring to both FIG. 4 and FIG. 5A, in some embodiments, the plurality of electrically conductive sheets 127 includes a stem portion 126 and a plurality of branch portions 127A integrally coupled to the stem portion 126. In some embodiments, the stem portion 126 can include opposing first and second sides such that the branch portions 127A are coupled to the opposing first and second sides. For example, in some embodiments, the branch portions 127A extends away from the conductive core 128. In some embodiments, the conductive core 128 includes a wire formed from one or more metals, e.g., platinum, titanium, gold or other.

Referring to FIG. 5A, the example branched anode electrode 121 can be fabricated by a method illustrated in FIG. 5A. In some embodiments of the method, the conductive textile material is first formed into sheets 125 having a suitable size and shape. The sheets 125 are then cut (e.g., using a textile stamp) to shape the material to form a stem portion 126 and a plurality of branches 127 integrally connected to the stem portion 126 of the sheets 125. Multiple of the cut sheets 125 are stacked together such that their stem portions 126 are generally aligned with each other and the stack of cut sheets 125 are wound around a conductive core 128 to form one of the branched anode electrodes 121. With this arrangement, the branched anode electrodes 121 each have a branched arrangement of electrically conductive sheets 127, also referred to as "brances 127," extending away from the conductive core 128. For example, by cutting the textile material with a textile stamp, the dimensions of the stem portion 126 of the sheets 125 and the branches 127, such as the thickness or length of individual branches 127 and/or the thickness of the stem portion 126, the size of the sheets 125, and/or the number of sheets 125, can be easily customized to improve surface area (e.g., for microbial adhesion to the sheets 125) and to allow for the fine-tuning of specific carbon source accessibility/ion mass transport.

In some examples, the conductive textile material sheets 125 have rectangular shape. The length of the sheets 125 can be determined by the length of the carbon portion of the branched anode. In some examples, the length of the sheets can vary, e.g., from 2 cm to 1 meter. The width of sheets 125 can be determined by the diameter of the branched anode. In some examples, the width of the sheets can vary, e.g., from 2 cm to 30 cm.

Referring to FIGS. 4 and 5A, the conductive textile material can be formed from a highly conductive material having a high surface area-to-volume ratio (SA/V) and that have optimized surface properties for microbial adhesion and extracellular electron transfer. In this way, for example, the amount of wastewater microbes that can adhere to the outer surface of the electrode 121 can be increased and the rate of the oxidation reaction can be improved. In some implementations, the sheets 125 can be formed from a woven carbon material (e.g., carbon fiber, graphite). Further, the conductive core 128 can be formed from a conductive material that efficiently removes transferred electrons from the textile material so that the electrons can quickly flow through the conductive core 128 towards the cathode of the MFC device 110.

In some implementations, the conductive core 128 is formed from a wire formed from a metal that includes, but is not limited to, platinum, titanium, Monel, gold and/or an electrically conductive alloy comprising any two or more thereof. In some implementations, the conductive core 128 can comprise a metal compound such as cobalt oxide, ruthenium oxide, a tungsten carbine, a tungsten carbide cobalt, a stainless steel, or a combination of any two or more thereof.

In some implementations, the conductive core 128 can comprise a non-metal conductive material such as graphite, a graphite-doped ceramic, a conducting material polymer such as poly aniline, a manganese-oxide coated graphite, or a combination of any two or more thereof. In general, the sheets 125 and the conductive core 128 can comprise any suitable material.

To further improve the oxidation reaction rate and the extracellular electron transfer rate, the conductive textile material can be pretreated and/or enhanced with different surface chemistries or deposited materials. For example, some material treatments, such as applying heat to the conductive textile material and/or introducing one or more solvents, acids, and/or bases, can prepare the conductive textile material for further surface modifications, while other material treatments, such as electrodepositing, spray coating, or dip coating conductive materials onto the conductive textile material, can enhance surface area, hydrophilicity, microbial attachment, and/or electrochemical activity of the conductive textile material. These material treatments can be performed in bulk on the conductive textile material before the sheets 125 are stamped and wound around the conductive core 128, improving the uniformity, efficiency, and cost-effectiveness of these material treatments.

Referring to FIG. 5B, in some examples, the branched anode electrode 121 can be configured to have a cylindrical shape with dimensions (h×d): 21.2 cm×2.5 cm. In this example, the stem 126 of the conductive textile material and/or the conductive core 128 has a length of 21.2 cm, and the branches 127 has a length of 14.8 cm and a diameter of 2.5 cm. The diagram of FIG. 5B shows one end of the example branched anode electrode 121 in inset 548 and another end in inset 549.

The length of the conductive textile material can be determined based on the size of the reactor housing 114, where the conductive textile material of the branched anode electrode 121 can occupy, for example, 90% of the height of reactor housing 114. The diameter of the branched anode electrode 121, in the example shown in FIG. 5B, was selected to provide high surface area without introducing significant decrease in electrodes conductivity, e.g., as a larger diameter of a branched anode electrode might have higher resistance. At the same time, a smaller dimeter of a branched anode electrode will have smaller surface area for bacterial growth and corresponding bioelectrochemical conversion of organics in wastewater.

Conventional anodes include electrodes having a brushed arrangement in which tows of conductive textile material are treated with a binding agent, which helps to bundle the fibers together and makes it easier to handle the fibers, and cut into short segments and placed along a wire stem and secured in place by twisting of the wire stem. This process repeats multiple times until a full brush is formed, at which time the binding agent is removed from the fibers. However, these brushed electrodes are more difficult to manufacture than branched electrodes since brush electrodes require more labor to align and secure bristles or fiber tows to the wire stem while the branched electrodes only require a textile stamp to cut the material into required sections and a winding mechanism to twist stacks of the stamped textile with a conductive through-post. Further, sheets of the textile materials are easier to cut and maneuver than thin bristles, which typically results in less waste and a higher efficiency when producing the branched electrodes than when producing brushed electrodes.

Accordingly, brushed electrodes are typically more expensive to manufacture than the branched electrodes 121 as manufacturing brushed electrodes requires that they be assembled by hand, which is both labor and time intensive. For example, manufacturing conventional brushed electrodes can cost between \$8 and \$25 per brush, depending on the size of the brush, while the estimated cost of manufacturing branched electrodes is approximately \$6 per brush. Additionally, any pretreatments applied to the tows to increase the effectiveness of the brushed electrodes before forming the brushed electrode are removed when the binding agent is stripped from the fibers, thereby requiring that applying surface treatments to the fibers to increase the surface area, microbial attachment, and/or chemical activity of the brushed electrode must be performed after forming the brushed electrode. However, uniformly applying the surface treatments to all of the fibers is difficult, time consuming, and expensive, which results in the overall effectiveness of the brushed electrodes being reduced in comparison to the branched electrodes 121 of the present disclosure.

Example implementations of some example embodiments of the branched anodes in MFC devices 110 were conducted. For example, several evaluations were conducted in laboratory scale reactors as well as large scale installations to characterize the performance of the branched electrode relative to the standard brush electrode of the same relative dimensions.

Figure 6:
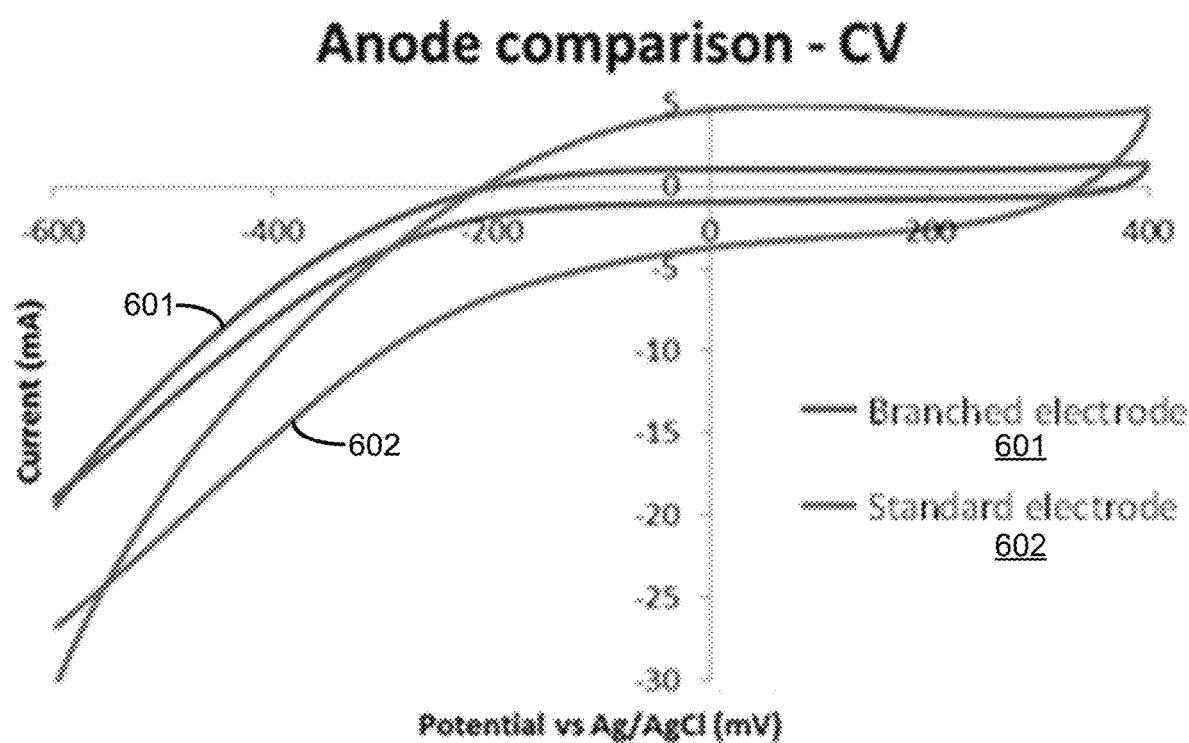
FIG. 6 shows a graph of cyclic voltammograms of example branched electrodes and brushed electrodes.

FIG. 6 shows the results of a test in which cyclic voltammograms (CVs) were generated for both the standard brush anode electrodes (labeled 602 in the graph) and the example branched anode electrodes (labeled 601 in the graph) to characterize surface area. The example results show that the branched electrodes had a smaller capacitive area than the brush electrodes, indicating that the branched electrodes had a lower overall surface area.

Figure 7:
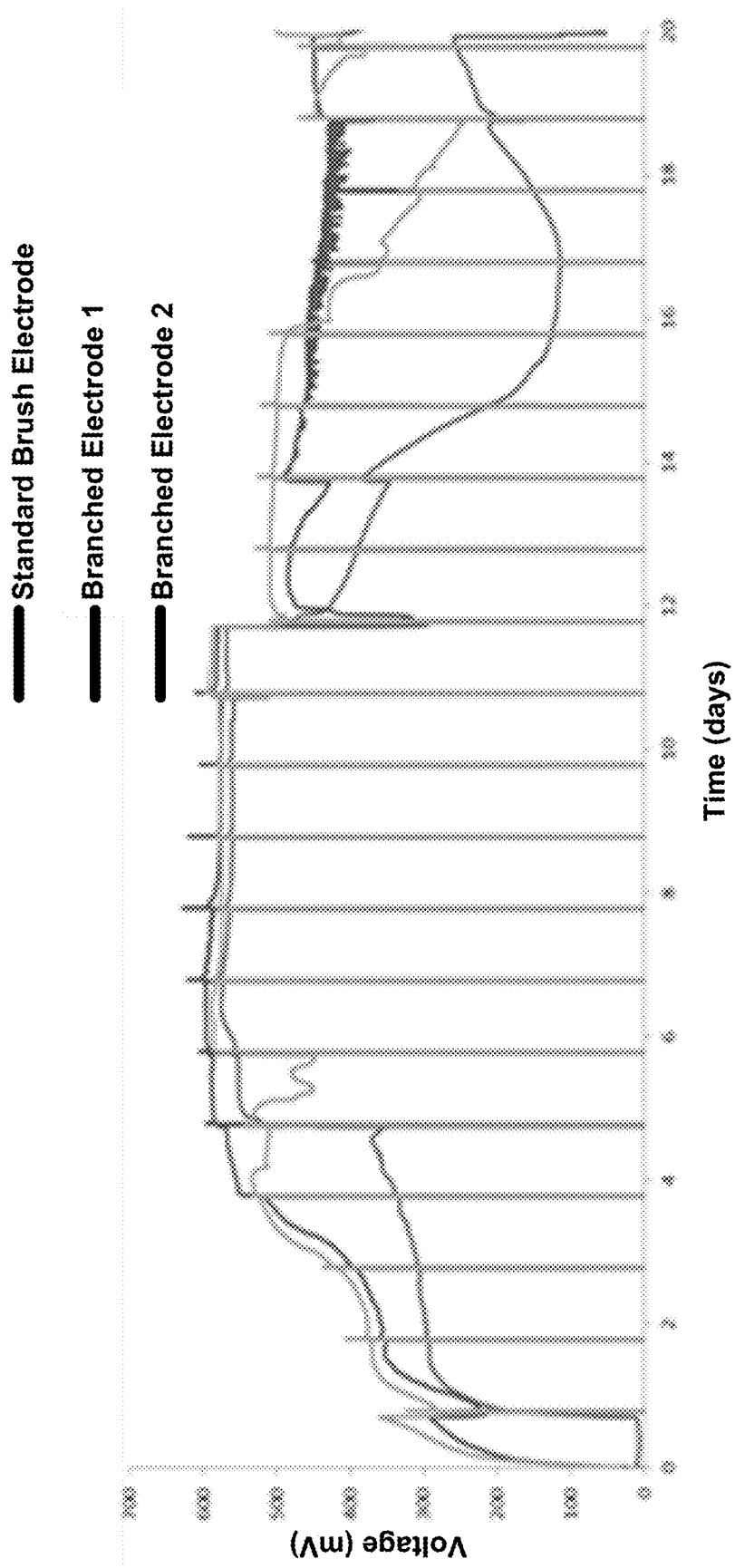
FIG. 7 shows a graph of measured voltages versus time for example MFCs with branched electrodes and brushed electrodes.

Yet, as shown in FIG. 7, when the different electrodes were placed into MFCs filled with swine waste, it was shown that the MFCs having an anode formed from branched electrodes had a faster startup time with a voltage response observed in the first two hours (e.g., across a 47 k$\Omega$ resistor). The standard brush electrode took a full 24 hours to reach the same voltage output as the branched electrodes. After 5 days of operation, all of the electrodes showed similar performance across the same applied resistance. The resistance was lowered to 4.7 k$\Omega$ for all reactors on day 12. After this change, the standard brush electrode quickly decreased in voltage relative to the branched electrodes and did not recover when the 47 k$\Omega$ was re-applied at day 14.

The different electrodes were also used as anodes for a large-scale MFC system used to treat swine waste. After two weeks of operation, the surface of the branched electrodes were imaged using a Scanning Electron Microscope (SEM) and compared to images taken of a brushed electrode that had been operating for two months in the same system.

Figure 8B:
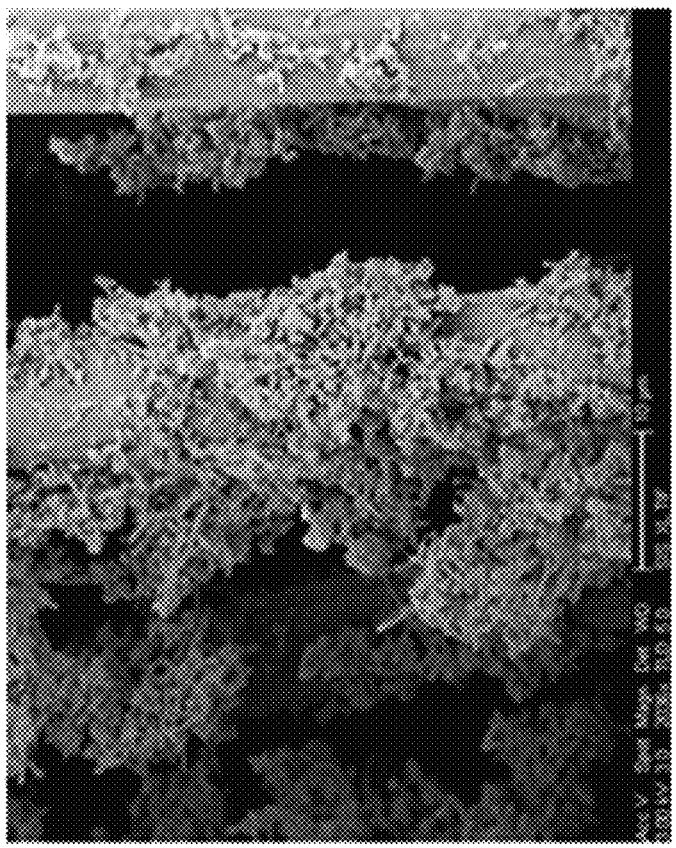
FIGS. 8A and 8B show images taken with a Scanning Electron Microscope of a brushed electrode and a branched electrode used in an MFC device.
Figure 8A:
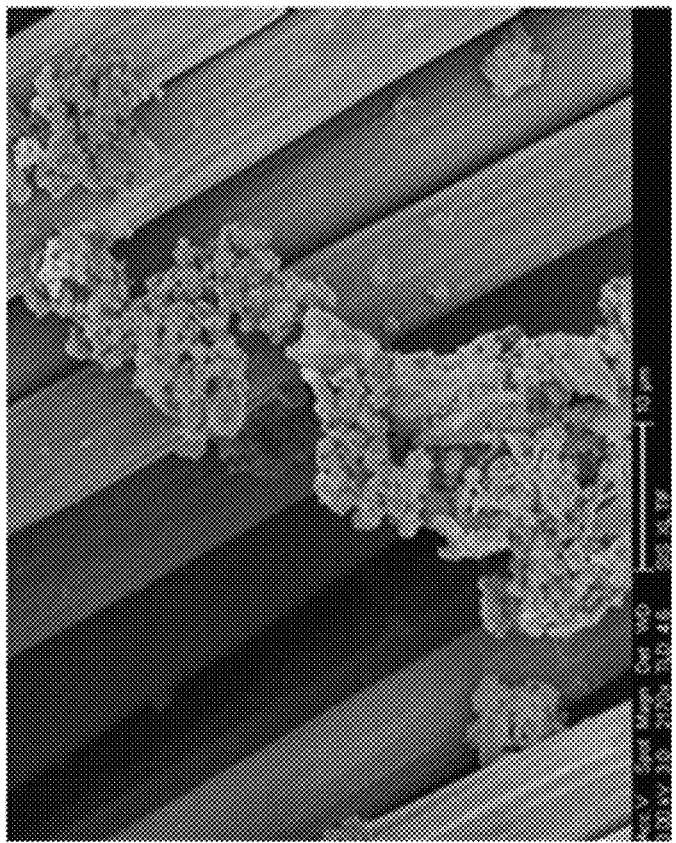

FIGS. 8A and 8B show SEM images of an example brushed electrode and a branched electrode used in an MFC device. As shown in FIG. 8A, which shows an image of one of the conventional brushed electrodes, and FIG. 8B, which shows an image of one of the branched electrodes, the amount of debris attached to branched electrode is significantly larger than the amount attached to the brushed electrode. Further, the debris attached to the standard brush electrode is primarily composed of organic debris and not microbial biomass; whereas the debris attached to the branched electrodes is primarily microbial biomass. The hypothesized reason for this observation includes improved conductivity across the branched material surfaces since the branched design provides more homogeneous surfaces and connections to the wire core. In addition, the fibers utilized for the textile may have surface properties that are better suited for microbial attachment, e.g., more hydrophilic and biologically accessible surface area.

Figure 9:
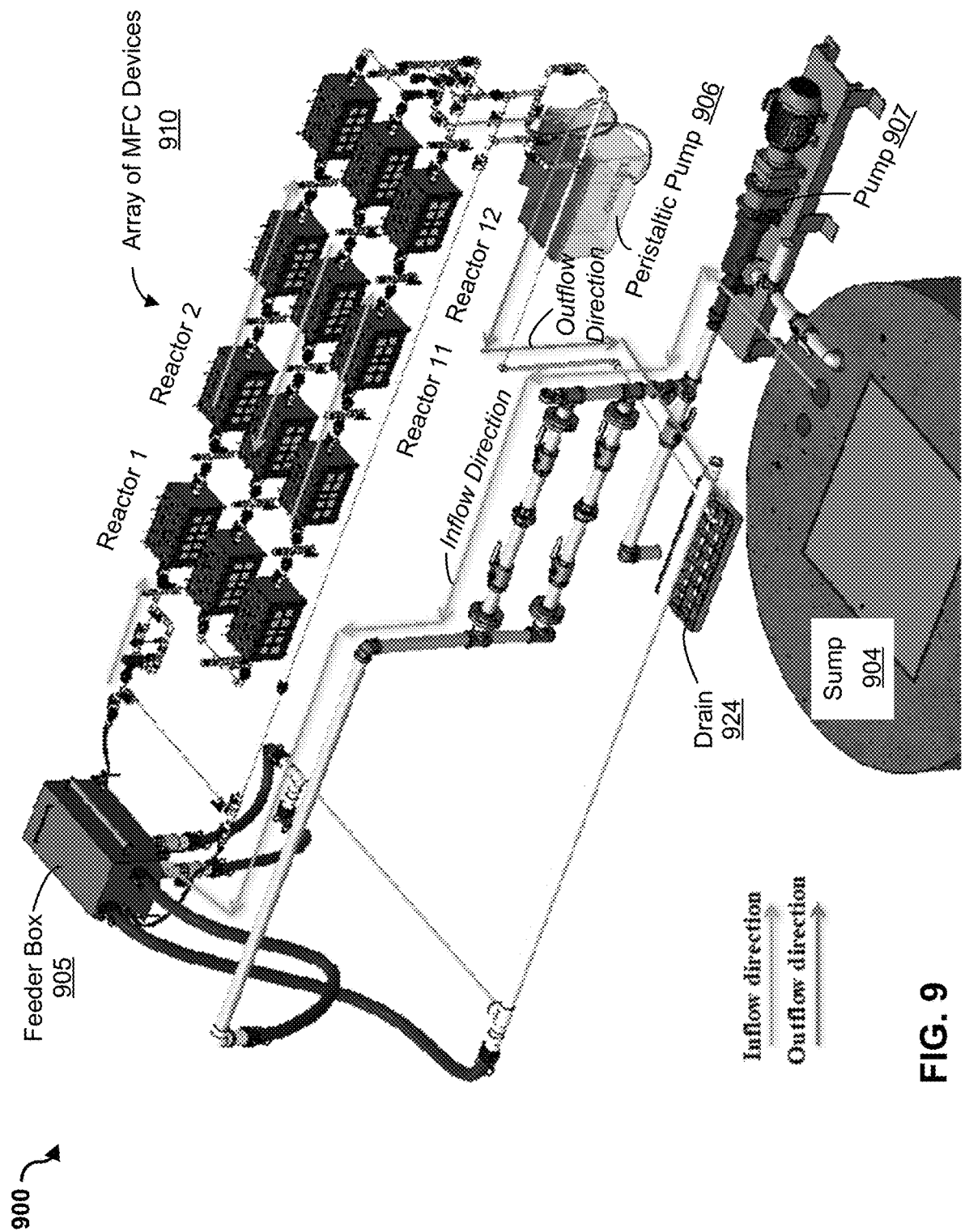
FIG. 9 shows a diagram of an example embodiment of the modular MFC system shown in FIG. 1 implemented for continuous treatment of swine waste at high treatment rates.

FIG. 9 shows a diagram of an example embodiment of the modular MFC system 900, referred to as MFC system 900, used in an experimental implementation for continuous treatment of swine waste at a farm at flow rates, e.g., such as 660 L/day (e.g., 174 gpd) for long-term operation. The modular MFC system 900 includes twelve reactors in an array of MFC devices 910 connected in hydraulic series with a consecutive flow of the solution, e.g., from Reactor 1 to Reactor 2 to Reactor 3 to . . . to Reactor 12. The overall volume of the example system 900 was 110 L. The waste stream was gravity-fed into the reactors of MFC devices 910 through the utilization of a feeder box 905, and a peristaltic pump 906 fluidically coupled to the array of MFC devices 910 was used to precisely control the flow rate. For example, the reactors of the MFC devices 910 are configured along the same plane, approximately; yet in some examples, the MFC system 900 can be configured such that the feeder box 905 is placed at a greater height than Reactor 1 of the MFC device array; Reactor 1 was positioned at a greater height than Reactor 2, and so forth, such that Reactor 12 had the lowest height with respect to the other reactors of the array of MFC devices 910. During continuous mode of operation, for example, the raw swine waste was stored in an underground sump 904 (e.g., 5,700 L) and from there pumped, via a pump 907, into the feeder box 905; after which, gravity-fed the reactors of the MFC devices 910 from the feeder box 905. In some examples, a degritter unit (not shown) is configured before the sump 904 to remove the large-mass and/or large-size particles from the raw wastewater before delivered to the sump 904. The treated water, bioelectrochemically treated by the MFC devices 910, was discarded into a sanitary sewer drain 924.

Figure 10:
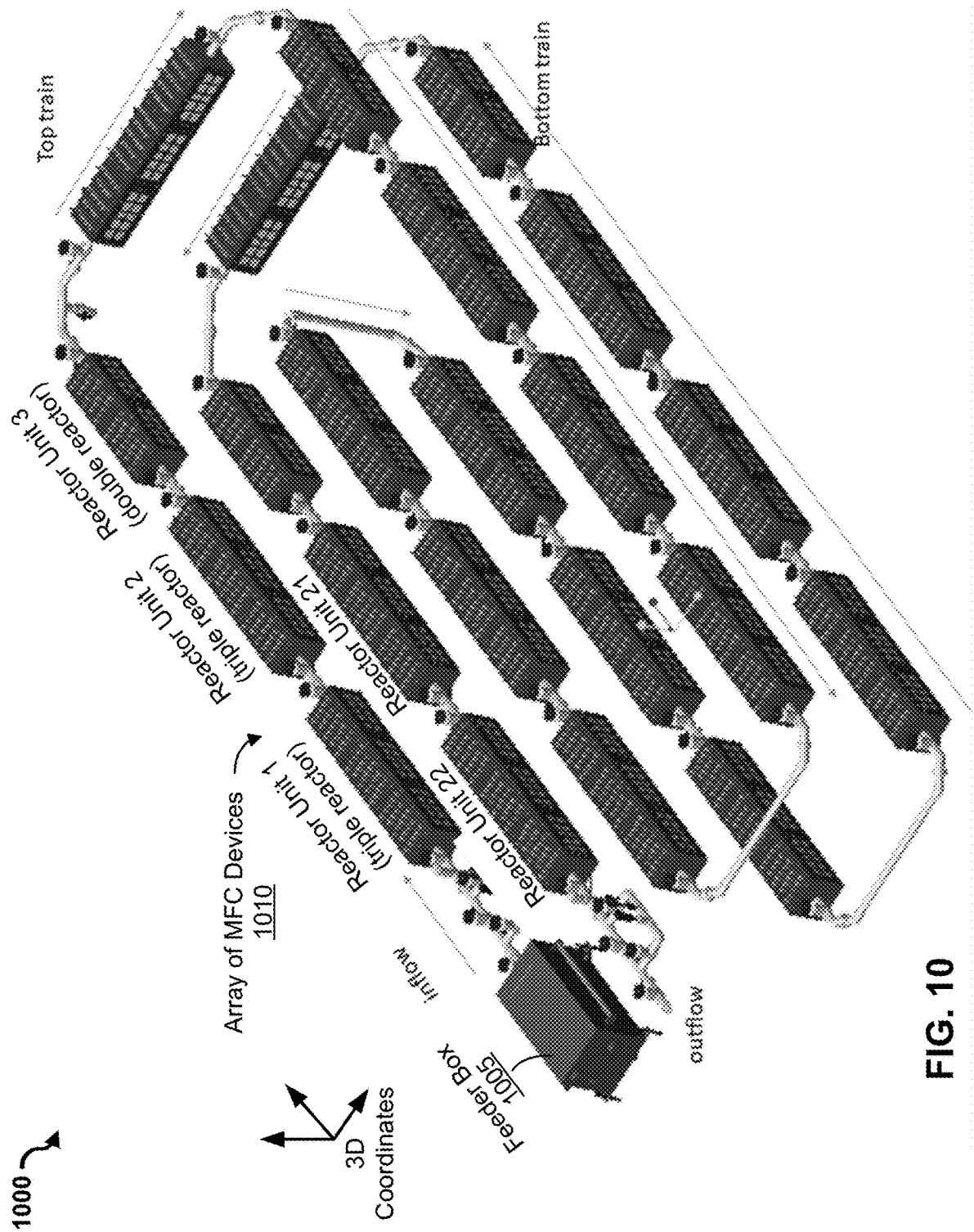
FIG. 10 shows a diagram of an example embodiment of a modular MFC system shown in FIG. 1 implemented for continuous treatment of domestic wastewater at high treatment rates.

FIG. 10 shows a diagram of another example embodiment of the modular MFC system 100, referred to as MFC system 1000, used in experimental implementations for continuous treatment of domestic wastewater at high treatment rates.

The example modular MFC system 1000 includes sixty-two reactors in an array of modular MFC devices 1010 three-dimensionally arranged in hydraulic series within a container housing (not shown). The modular MFC devices 1010 of the array can be configured in a single reactor unit comprising a single reactor 111, a double reactor unit comprising two reactors 111, and/or a triple reactor unit comprising three reactors 111. The example MFC system 1000, as shown in the diagram of FIG. 10, includes twenty-two standalone reactor units (assemblies) of double and triple reactor designs that combine to provide the sixty-two total reactors of the example MFC system 1000. For example, Reactor Unit 1 includes three reactors 111 ("triple reactor") directly coupled to each other and contained within in a single housing for hosting the triple reactor unit; and Reactor Unit 3 includes two reactors 111 ("double reactor") directly coupled to each other and contained within in a single housing for hosting the double reactor unit.

The array of modular MFC devices 1010 are spatially arranged in the container housing to begin at a height and flow the wastewater fluid through the array downward. This spatial arrangement allows for increased packing density of the modular MFC devices 1010 within the container. The modular MFC devices 1010 of the array are arranged to receive the pre-treated wastewater from the feeder box 1005 at the Reactor Unit 1, e.g., via gravity-fed flow, in which the fluid undergoes a consecutive flow from Reactor Unit 1 to Reactor Unit 2 to Reactor Unit 3 to . . . to Reactor Unit 22. For example, the feeder box 1005 is positioned above the plane of the reactors to provide a gravity-fed flow, e.g., in which no pumps are required for the system 1000. Also, for example, the fluid level in the feeder box 1005 can affect control of the liquid level inside the reactors.

In some embodiments, for example, one or some of the modular MFC devices 1010 are arranged in a first vertical plane (e.g., first planar set), which output the treated fluid to the next planar set of modular MFC devices 1010 in a second vertical plane, and so forth. In some embodiments, for example, a separate feeder box can be configured between the different planar sets of modular MFC devices 1010. In such implementations, the planar feeder box for each planar level can help prevent pressure differences and assist in gravity flow of the fluid as it passes through the array of modular MFC devices 1010.

In example implementations of the system 1000, the waste stream was gravity-fed into the reactors of MFC devices 1010 through the utilization of the planar feeder boxes (note that only initial feeder box 1005 is shown in the diagram). For example, the multiple vertical levels can work as one treatment train, and the two or more levels are connected hydraulically in series; or the two or more levels can treat the wastewater in parallel to increase treatment volume. During continuous mode of operation, for example, the waste solution can be stored in an underground sump and from there pumped into an equalization tank (not shown). The treated water, bioelectrochemically treated by the MFC devices 1010, can be discarded into a sanitary sewer drain.

At least some example embodiments and implementations of the present technology can include an anode composed of carbon textile material with high surface area and enhanced electron transfer rate. The anode can be integrated into a number of different microbial fuel cell designs and can be fabricated from sheets of conductive textiles that are cut to have a single central stem with attached branches that are then stacked and wound around a conductive wire core. Each textile sheet of the anode can be pretreated and/or enhanced with different surface chemistries or deposited materials to further improve microbial attachment. Different material treatments may include heat, solvents, acids or bases to functionalize and/or prepare materials for other surface modifications. Additional, surface modifications may include electrodeposition, spray or dip coating of conductive materials to enhance surface area, hydrophilicity, microbial attachment and/or electrochemical activity. All of the pretreatments and surface modifications can be conducted in bulk prior to stamping and winding to make the process more efficient, uniform and cost-effective. The various material treatments and surface modifications can help to improve bacteria attachment and biofilm formation on the anode.

Other example embodiments and implementations of the present technology can include an anode having an open circuit potential of from about −300 mV vs SHE to about −100 mV vs SHE and that is formed from a carbon textile material having a surface area of from about 2 $m^2$ to about 5 $m^2$. The carbon textile material can include woven carbon fibers and can be formed from multiple sheets stacked together, where each of the sheets has a single stem with branches attached to the stem. The stacked carbon textile branches are mounted on a conductive core that comprises a wire, rod, post, or wire cloth. For example, the conductive core can comprise a conductive metal-based material, including platinum, titanium, gold, stainless steel, nickel, and/or Monel, an electrically conductive alloy comprising any two or more of platinum, titanium or gold, and/or at least one of a non-metal conductive material, such as graphite, a graphite-doped ceramic, a conducting material polymer such as a polyaniline, or a manganese-oxide coated graphite. The carbon textile material is pretreated with heat, solvent, acid and/or base to improve microbial attachment and/or activity on the carbon textile material and/or to prepare said carbon textile for other surface modifications.

EXAMPLES

In some example embodiments in accordance with the present technology, an anode assembly for a microbial fuel cell (example 1) includes an anode plate having a plurality of holes; and a plurality of electrodes positioned within individual of the plurality of holes. Each of the plurality of electrodes comprises a plurality of sheets of conductive textile material; and a conductive core, wherein each of the plurality of sheets are wound around the conductive core.

Example 2 includes the anode assembly of example 1 or any of the succeeding examples, wherein conductive textile material comprises a woven carbon material.

Example 3 includes the anode assembly of example 2, wherein the woven carbon material comprises carbon fiber.

Example 4 includes the anode assembly of any of the preceding or succeeding examples, wherein each of the plurality of sheets includes a stem portion and a plurality of branch portions integrally coupled to the stem portion.

Example 5 includes the anode assembly of example 4, wherein the stem portion includes opposing first and second sides and wherein the branch portions are coupled to the opposing first and second sides.

Example 6 includes the anode assembly of examples 4-5, wherein each of the branch portions extends away from the conductive core.

Example 4 includes the anode assembly of any of the preceding examples, wherein the conductive core comprises a wire formed from one or more metals.

In some example embodiments in accordance with the present technology, a method of producing an electrode for an anode assembly of a microbial fuel cell assembly (example 8) includes providing a plurality of sheets of a conductive textile material; with a textile stamp, cutting each of the plurality of sheets to form a stem portion and a plurality of branch portions integrally connected to the stem portion; stacking the plurality of sheets together; and winding the stack of the plurality of sheets around a conductive core.

Example 9 includes the method of any of example 8 or any of the succeeding examples, wherein stacking the plurality of sheets together comprises generally aligning the stem portions of each of the plurality of sheets.

Example 10 includes the method of any of the preceding examples or succeeding examples, wherein winding the stack of the plurality of sheets around the conductive core comprises winding the plurality of sheets such that each of the plurality of branch portions for each of the plurality of sheets extends away from the conductive core.

Example 11 includes the method of any of the preceding or succeeding examples, wherein the conductive textile material comprises a woven carbon material.

Example 12 includes the method of any of the preceding examples, wherein the conductive core comprises a wire formed form at least one metal.

In some example embodiments in accordance with the present technology, an anode electrode (example 13) includes a plurality of sheets of conductive textile material; and a conductive core, wherein each of the plurality of sheets are wound around the conductive core.

Example 14 includes the anode electrode of example 13, wherein conductive textile material comprises a woven carbon material.

Example 15 includes the anode electrode of example 14, wherein the woven carbon material comprises carbon fiber.

Example 16 includes the anode electrode of any of the preceding or succeeding examples for the anode electrode, wherein each of the plurality of sheets includes a stem portion and a plurality of branch portions integrally coupled to the stem portion.

Example 17 includes the anode electrode of example 16, wherein the stem portion includes opposing first and second sides and wherein the branch portions are coupled to the opposing first and second sides.

Example 18 includes the anode electrode of examples 16-17, wherein each of the branch portions extends generally away from the conductive core.

Example 19 includes the anode electrode of any of the preceding examples for the anode electrode, wherein the conductive core comprises a wire formed from one or more metals.

In some example embodiments in accordance with the present technology, a microbial fuel cell (MFC) system for treating wastewater and generating electrical energy through a bioelectrochemical waste-to-energy conversion process (example 20) includes a wastewater headworks module positioned to receive the wastewater; a treated water collection module; and at least one MFC device coupled in series between the wastewater headworks module and the treated water collection water. The at least one MFC device is positioned to provide treated water to the treated water collection module. The at least one MFC device includes a housing, wherein the housing is configured to receive the wastewater from the wastewater headworks module; a cathode assembly positioned within the housing; and an anode assembly positioned within the housing and electrically coupled to the cathode assembly, wherein the anode assembly comprises a plurality of electrodes and wherein individual of the plurality of electrodes comprises a plurality of sheets of a conductive textile material stacked together and wound around a conductive core.

Example 21 includes the microbial fuel cell system of example 20 or any of the succeeding examples, wherein each of the plurality of sheets comprises a stem and a plurality of branches integrally coupled to the stem.

Example 22 includes the microbial fuel cell system of any of the preceding or succeeding examples, wherein the conductive textile material comprises a woven carbon material.

Example 23 includes the microbial fuel cell system of example 22, wherein the woven carbon material comprises carbon fiber.

Example 24 includes the microbial fuel cell system of any of the preceding or succeeding examples, wherein the conductive core comprises a wire formed from at least one conductive metal.

Example 25 includes the microbial fuel cell system of any of the preceding or succeeding examples, wherein the anode assembly further comprises an anode plate having a plurality of holes wherein each of the plurality of electrodes is positioned within one of the plurality of holes.

Example 26 includes the microbial fuel cell system of any of the preceding or succeeding examples, wherein each of the sheets of the conductive textile material in each of the plurality of electrodes is configured to support a biofilm (e.g., of microbes) that process the wastewater, to receive electrons from microbe processing of the wastewater, and to provide the electrons to the conductive core.

Example 27 includes the microbial fuel cell system of any of the preceding or succeeding examples, wherein the anode assembly and the cathode assembly are electrically connected to each other with an external wire, and wherein each of the conductive cores in the plurality of electrodes is configured to provide the electrons to cathode assembly using the external wire.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An anode electrode, comprising:
a plurality of sheets of a conductive textile material, wherein each of the plurality of sheets includes a stem portion and a plurality of branch portions integrally coupled to the stem portion; and
a conductive core, wherein the plurality of sheets are wound around the conductive core and the branch portions of the plurality of sheets extend away from the conductive core.

2. The anode electrode of claim 1, wherein conductive textile material comprises a woven carbon material.

3. The anode electrode of claim 2, wherein the woven carbon material comprises carbon fiber.

4. The anode electrode of claim 1, wherein the sheets of the conductive textile material include a rectangular shape.

5. The anode electrode of claim 1, wherein the sheets of the conductive textile material include a length of in a range of 2 cm to 1 meter and a width in a range of 2 cm to 30 cm.

6. The anode electrode of claim 1, wherein the conductive core comprises a wire.

7. An anode electrode, comprising:
a plurality of sheets of a conductive textile material, wherein each of the plurality of sheets includes a stem portion and a plurality of branch portions integrally coupled to the stem portion; and
a conductive core, wherein the plurality of sheets are wound around the conductive core and the branch portions of the plurality of sheets extend away from the conductive core,
wherein the stem portion includes a first side and a second side opposing the first side, wherein the branch portions are coupled to the opposing first and second sides.

8. The anode electrode of claim 7, wherein conductive textile material comprises a woven carbon material.

9. The anode electrode of claim 8, wherein the woven carbon material comprises carbon fiber.

10. The anode electrode of claim 7, wherein the sheets of the conductive textile material include a rectangular shape.

11. The anode electrode of claim 7, wherein the sheets of the conductive textile material include a length of in a range of 2 cm to 1 meter and a width in a range of 2 cm to 30 cm.

12. The anode electrode of claim 7, wherein the conductive core comprises a wire.

13. A method of manufacturing an anode electrode that includes (i) a plurality of sheets of a conductive textile material, wherein each of the plurality of sheets includes a stem portion and a plurality of branch portions integrally coupled to the stem portion, and (ii) a conductive core, wherein the plurality of sheets are wound around the conductive core and the branch portions of the plurality of sheets extend away from the conductive core, the method comprising:
providing the plurality of sheets of the conductive textile material;
cutting each of the plurality of sheets to form the stem portion and the plurality of branch portions integrally connected to the stem portion for each of the plurality of sheets of the conductive textile material;
stacking the plurality of sheets together; and
winding the stack of the plurality of sheets around the conductive core, thereby producing the anode electrode.

14. The method of claim 13, wherein the cutting of the plurality of sheets uses a textile stamp.

15. The method of claim 13, wherein the stacking the plurality of sheets together comprises aligning the stem portions of each of the plurality of sheets.

16. The method of claim 13, wherein the winding the stack of the plurality of sheets around the conductive core comprises winding the plurality of sheets such that each of the plurality of branch portions for each of the plurality of sheets extends away from the conductive core.

17. The method of claim 13, wherein the conductive textile material comprises a woven carbon material, and wherein the conductive core comprises a wire.

* * * * *